United States Patent
Ko et al.

(10) Patent No.: US 12,397,886 B2
(45) Date of Patent: Aug. 26, 2025

(54) APPARATUS AND METHOD FOR CALCULATING THE COLLISON RISK OF A SHIP

(71) Applicant: AVIKUS CO., LTD., Seoul (KR)

(72) Inventors: Kwang Sung Ko, Seoul (KR); In Beom Kim, Seoul (KR); Jin Mo Park, Seoul (KR); Hui Yong Choi, Seoul (KR); Hu Jae Choi, Seoul (KR); Su Rim Kim, Seoul (KR); Gwang Hyeok Choi, Seoul (KR); Do Yeop Lee, Seoul (KR); Do Yeon Jung, Seoul (KR); Jin Young Oh, Seoul (KR); Je Hyun Cha, Seoul (KR); Ji Yoon Park, Seoul (KR); Won Chul Yoo, Seoul (KR)

(73) Assignee: AVIKUS CO., LTD., Seoul (KR)

( * ) Notice: Subject to any disclaimer, the term of this patent is extended or adjusted under 35 U.S.C. 154(b) by 0 days.

(21) Appl. No.: 18/931,091

(22) Filed: Oct. 30, 2024

(65) Prior Publication Data

US 2025/0065996 A1     Feb. 27, 2025

Related U.S. Application Data

(63) Continuation of application No. PCT/KR2023/022034, filed on Dec. 29, 2023.

(30) Foreign Application Priority Data

Dec. 30, 2022 (KR) .................. 10-2022-0190733
Jan. 11, 2023 (KR) .................. 10-2023-0004040

(51) Int. Cl.
*G08G 3/02*   (2006.01)
*B63B 43/18*  (2006.01)
(Continued)

(52) U.S. Cl.
CPC .............. *B63B 43/18* (2013.01); *B63B 49/00* (2013.01); *B63B 79/10* (2020.01); *G08G 3/02* (2013.01); *G01C 21/20* (2013.01)

(58) Field of Classification Search
CPC ........ G01C 21/20; G01C 21/203; G08G 3/02; Y02A 30/30; B63B 43/18; B63B 79/10; B63B 49/00
(Continued)

(56) References Cited

U.S. PATENT DOCUMENTS 10,370,063 B2 *   8/2019   Skidmore ............... B63B 79/30
2014/0160165 A1   6/2014   Kim
(Continued)

FOREIGN PATENT DOCUMENTS

AU   2016205934 A1 *   7/2017   ............. B63B 71/00
CN   111951606 A   *  11/2020   ........... G01C 21/203
(Continued)

OTHER PUBLICATIONS

An English-translated version of CN-114708750-B (published on Sep. 6, 2022).*
(Continued)

*Primary Examiner* — Cuong H Nguyen
(74) *Attorney, Agent, or Firm* — Harvest IP Law, LLP

(57) ABSTRACT

A method of calculating a collision risk of a ship according to an embodiment of the present disclosure may include: calculating an available velocity area based on maneuvering performance of a host ship; calculating a velocity obstacle area where there is a possibility of collision between an object and the host ship; and calculating a collision risk based on at least one of the available velocity area, the velocity obstacle area, and a preset weight.

13 Claims, 16 Drawing Sheets

(51) Int. Cl.
  B63B 49/00 (2006.01)
  B63B 79/10 (2020.01)
  G01C 21/20 (2006.01)
(58) Field of Classification Search
  USPC .......................................................... 701/301
  See application file for complete search history.

(56) References Cited

U.S. PATENT DOCUMENTS

| | | | | |
|---|---|---|---|---|
| 2018/0273144 | A1* | 9/2018 | Skidmore | B63B 79/30 |
| 2021/0027225 | A1* | 1/2021 | Mikalsen | B63B 79/40 |

FOREIGN PATENT DOCUMENTS

| | | | | | |
|---|---|---|---|---|---|
| CN | 111951606 | B | * | 7/2021 | G01C 21/203 |
| CN | 114595776 | A | * | 6/2022 | G06F 17/18 |
| CN | 114708750 | B | * | 9/2022 | B63B 71/00 |
| CN | 118197099 | A | * | 6/2024 | G08G 3/02 |
| EP | 3770882 | A1 | | 1/2021 | |
| JP | H10288663 | A | | 10/1998 | |
| JP | 2003194551 | A | | 7/2003 | |
| JP | 2005353032 | A | | 12/2005 | |
| JP | 2009229824 | A | | 10/2009 | |
| JP | 5276720 | B2 | * | 8/2013 | B63B 49/00 |
| JP | 5369268 | B1 | | 12/2013 | |
| JP | 2016055772 | A | | 4/2016 | |
| JP | 2018049639 | A | | 3/2018 | |
| JP | 2021144149 | A | | 9/2021 | |
| KR | 20120065045 | A | | 6/2012 | |
| KR | 101275277 | B1 | | 6/2013 | |
| KR | 101298925 | B1 | | 8/2013 | |
| KR | 20140007614 | A | | 1/2014 | |
| KR | 101693982 | B1 | | 1/2017 | |
| KR | 101850866 | B2 | | 4/2018 | |
| KR | 20180046053 | A | | 5/2018 | |
| KR | 20180065411 | A | | 6/2018 | |
| KR | 101920707 | B1 | | 11/2018 | |
| KR | 101976403 | B1 | * | 8/2019 | B63B 49/00 |
| KR | 20200027871 | A | | 3/2020 | |
| KR | 102099699 | B1 | | 4/2020 | |
| KR | 20210044672 | A | | 4/2021 | |
| KR | 102251720 | B1 | | 5/2021 | |
| KR | 20210063841 | A | | 6/2021 | |
| KR | 102276678 | B1 | | 7/2021 | |
| KR | 102408225 | B1 | | 6/2022 | |
| KR | 20220132910 | A | | 10/2022 | |
| KR | 102556079 | B1 | | 7/2023 | |
| KR | 102613592 | B1 | | 12/2023 | |
| WO | WO-2021016603 | A1 | * | 1/2021 | B63B 79/00 |

OTHER PUBLICATIONS

Hu Y, Zhang A, Tian W, Zhang J, Hou Z. Multi-ship collision avoidance decision-making based on collision risk index. Journal of Marine Science and Engineering. Aug. 20, 2020;8(9):640. (Year: 2020).*

Peng, Yu. "An Intelligent Collision Avoidance Strategy for Inland Waterways." IEEE Access (Year: 2024).*

Troupiotis-Kapeliaris, Alexandros, Christos Kastrisios, and Dimitris Zissis. "Vessel Trajectory Data Mining: a review." IEEE Access. (Year: 2025).*

Hammedi, Wided, Bouziane Brik, and Sidi Mohammed Senouci. "Toward optimal MEC-based collision avoidance system for cooperative inland vessels: A federated deep learning approach." IEEE transactions on intelligent transportation systems 24.2 (2022): 2525-2537. (Year: 2022).*

Tengesdal, Trym, et al. "Ship collision avoidance and anti grounding using parallelized cost evaluation in probabilistic scenario-based model predictive control." IEEE Access 10 (2022): 111650411664. (Year: 2022).*

\* cited by examiner

APPARATUS AND METHOD FOR CALCULATING THE COLLISON RISK OF A SHIP

CROSS REFERENCE TO RELATED APPLICATIONS

This application is a continuation application of International Application No. PCT/KR2023/022034 filed on Dec. 29, 2023, which claims priority from Korean Patent Application No. 10-2022-0190733 filed on Dec. 30, 2022, and Korean Patent Application 10-2023-0004040 filed Jan. 11, 2023, the entire contents of which are incorporated herein for all purpose by this reference.

TECHNICAL FIELD

The present disclosure relates to a device and method for calculating a collision risk of a ship.

BACKGROUND ART

Conventional navigation aid devices for ships have only a function of simply recognizing an object near the ship and displaying the recognized object on a screen, to provide only alarms about obstacles to drivers of powered ships.

However, the driver keeps eyes forward while navigating and thus does not continuously view displayed information. They must independently take actions such as navigation planning or collision avoidance, based on the information provided, and thus, are not provided with functions for navigation convenience and enhanced safety.

Prior arts provide an invention for observing movements of other ships and determining a collision risk by using sensors such as a RADAR (radio detection and ranging), an automatic identification system (AIS), an electronic navigational chart (ENC), or a global positioning system (GPS). However, not all ships have such sensors installed, and navigation aid devices are unable to recognize which sensors are installed.

In addition, when an insufficient number of sensors are mounted on a ship, functions beyond displaying a camera screen cannot be provided.

In addition, in prior arts, a give-way vessel and a single avoidance route are determined in accordance with the International Regulations for Preventing Collisions at Sea. Therefore, a flexible avoidance route depending on the situation cannot be derived, and only avoidance is possible in accordance with the International Regulations for Preventing Collisions at Sea.

Because the recognition of dangerous situations at sea cannot be solely entrusted to an individual operator, a plurality of sensors are used to assist the recognition. However, except for some ships such as ultra-large ships, it is rare for all of the above-mentioned sensors to be installed. Also, there is no navigation aid device that can recognize in advance which sensors are installed, and provide information by integrating sensor data from installed sensors, and derive an avoidance route according to a situation.

DISCLOSURE

Technical Problem

The present disclosure provides a method and device for calculating a collision risk of a ship. In addition, the present disclosure provides a computer-readable recording medium having recorded thereon a program for causing a computer to execute the method.

Technical objectives of the present disclosure are not limited to the foregoing, and other unmentioned objectives or advantages of the present disclosure would be understood from the following description and be more clearly understood from the embodiments of the present disclosure. In addition, it would be appreciated that the objectives and advantages of the present disclosure may be implemented by means provided in the claims and a combination thereof.

Technical Solution

According to a first aspect of the present disclosure, there may be provided a method of calculating a collision risk of a ship, the method including: calculating an available velocity area based on maneuvering performance of a host ship; calculating a velocity obstacle area where there is a possibility of collision between an object and the host ship; and calculating a collision risk based on at least one of the available velocity area, the velocity obstacle area, and a preset weight.

According to a first aspect of the present disclosure, there may be provided a device for calculating a collision risk of a ship, the device including: at least one memory; and at least one processor, wherein the at least one processor is configured to calculate an available velocity area based on maneuvering performance of a host ship, calculate a possible collision area of an object and the host ship, and calculate a collision risk based on at least one of the available velocity area and the possible collision area.

According to a third aspect of the present disclosure, there may be provided a computer-readable recording medium having recorded thereon a program for causing a computer to execute the method according to the first aspect.

In addition, other methods and systems for implementing the present disclosure, and a computer-readable recording medium having recorded thereon a computer program for executing the methods may be further provided.

Other aspects, features, advantages other than those described above will become apparent from the following drawings, claims, and detailed description of the present disclosure.

Advantageous Effects

According to an embodiment of the present disclosure, by calculating a collision risk based on an available velocity area, a velocity obstacle area, and a preset weight, an accurate collision risk may be provided more quickly and, accordingly, a highly safe avoidance route may be provided.

In addition, according to an embodiment of the present disclosure, the type of a sensor installed in a host ship may be identified in advance, an object around the host ship may be identified from the installed sensor unit to predict a collision risk and derive an avoidance route, such that the host ship may follow the derived route.

In addition, according to an embodiment of the present disclosure, even when not all of a plurality of sensors required for predict a collision risk and setting a route are installed, collision risk prediction and route setting may be performed by using only some of installed sensors.

Effects of the present disclosure are not limited to the foregoing, and other unmentioned effects would be clearly understood by those skilled in the art from the following description.

MODE FOR INVENTION

Figure 1:
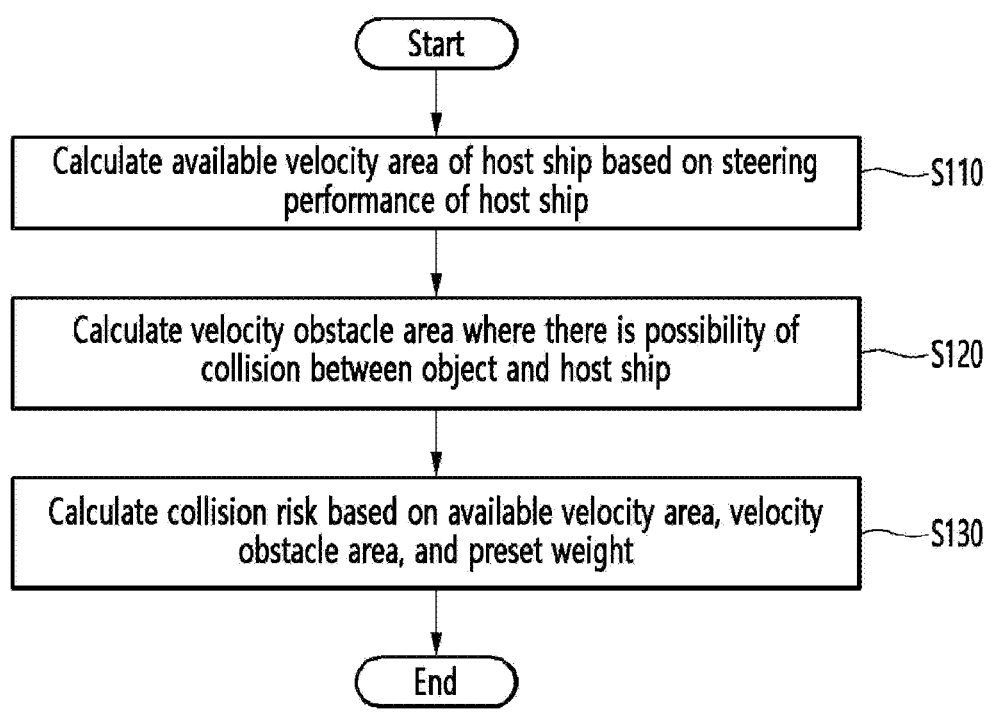
FIG. 1 is a flowchart for describing an example of a method of calculating a collision risk of a ship, according to an embodiment.

Hereinafter, various embodiments of the present disclosure will be described with reference to the accompanying drawings. Various embodiments of the present disclosure may be variously modified and may have various embodiments, and particular embodiments are illustrated in the drawings and detailed descriptions related to the embodiments are described. However, this is not intended to limit various embodiments of the present disclosure to particular modes of practice, and it is to be appreciated that all changes, equivalents, and/or substitutes that do not depart from the spirit and technical scope of various embodiments of the present disclosure are encompassed in the present disclosure. With regard to the description of the drawings, similar reference numerals are used to refer to similar elements.

As used in various embodiments of the present disclosure, the expressions "include", "may include", and other conjugates refer to the existence of a corresponding disclosed function, operation, or constituent element, and do not limit one or more additional functions, operations, or constituent elements. In addition, as used in various embodiments of the present disclosure, the terms "include", "have", and other conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

As used in various embodiments of the present disclosure, expressions such as "or" include any and all combinations of the listed words. For example, "A or B" may include A, may include B, or may include both A and B.

As used in various embodiments of the present disclosure, expressions such as "first" or "second" may modify various components of various embodiments, but do not limit the components. For example, the expressions do not limit the order and/or importance of the components. The expressions may be used to distinguish one component from another. For example, a first user device and a second user device are all user devices, and indicate different user devices. For example, a first element may be referred to as a second element, and a second element may be referred to as a first element in a similar manner, without departing from the scope of various embodiments of the present disclosure.

As used in embodiments of the present disclosure, terms such as "module", "unit", "part", etc., denote a unit of a component that performs at least one function or operation, and may be implemented as hardware or software or a combination of hardware and software. In addition, a plurality of "modules", "units", "parts", etc. may be integrated into at least one module, circuitry or chip to be implemented as at least one processor, except for cases in which each of them needs to be implemented as separate particular hardware.

The terms used in various embodiments of the present disclosure are used only to describe a particular embodiment, and are not intended to limit the various embodiments of the present disclosure. Singular forms are intended to include plural forms as well, unless the context clearly indicates otherwise.

Unless otherwise defined, all terms, including technical and scientific terms, used herein have the same meaning as commonly understood by those of skill in the art to which the present disclosure pertains based on an understanding of the present disclosure.

Terms, such as those defined in commonly used dictionaries, are to be interpreted as having a meaning that is consistent with their meaning in the context of the relevant art and various embodiments of the present disclosure, and are not to be interpreted in an idealized or overly formal sense unless expressly so defined herein.

Hereinafter, embodiments of the present disclosure will be described in more detail with reference to the accompanying drawings. In addition, operations according to an embodiment of the present disclosure to be described below may be performed by a processor 14 of FIG. 16. The processor 14 of FIG. 16 will be described in detail below with reference to FIG. 16.

FIG. 1 is a flowchart for describing an example of a method of calculating a collision risk of a ship, according to an embodiment.

In operation S110, the processor 14 calculates an available velocity area of a host ship related to the maneuvering performance of the host ship. The available velocity area may be indicated as an area that the host ship may be potentially located after moving from a current position of the host ship for a predetermined time using available various velocities of the host ship. The available velocity area of the host ship may include information about the velocity and position of the host ship after a predetermined time. For example, the available velocity area of the host ship may include a velocity vector according to a position of the host ship after a predetermined time. In addition, the available velocity area of the host ship may include an acceleration vector, an angular acceleration vector, a position vector, and the like of the host ship after a predetermined time.

For example, the processor 14 may calculate the available velocity area of the host ship by considering the dynamics of the host ship. As another example, the processor 14 may calculate the available velocity area of the host ship by considering the kinematics of the host ship. As another example, the processor 14 may calculate the available velocity area of the host ship by considering the specifications of equipment included in the host ship (e.g., propellers, or motors of the host ship). As another example, the processor 14 may calculate the available velocity area of the host ship by considering a state of the host ship (e.g., balance, full-load condition, or ballast state). As another example, the processor 14 may calculate the available velocity area of the host ship by considering external forces on the host ship (e.g., sea winds or ocean currents).

In other words, the processor 14 may calculate the available velocity area of the host ship by considering various factors related to maneuvering of the host ship. The host ship may be equipped with various sensors to provide the information related to such various factors related to maneuvering of the host ship. Meanwhile, examples of methods of calculating an available velocity area of a host ship are not limited to those described above.

Hereinafter, an example will be described in which the processor 14 calculates the available velocity area of the host ship by considering the kinematics of the host ship according to Equations 1 to 3 below.

$$\sum_{j=1}^{N} F_j = ma \quad \text{[Equation 1]}$$

$$v_i = v_{i-1} + \Delta t \cdot a \quad \text{[Equation 2]}$$

$$p_i = p_{i-1} + \Delta t \cdot v_i \quad \text{[Equation 3]}$$

Referring to Equations 1 to 3, F denotes a force with respect to the dynamics, m denotes the mass of the host ship, a denotes the acceleration of the host ship, v denotes the velocity of the host ship, and p denotes a position vector of the host ship. Thus, the processor 14 may calculate the acceleration a of the host ship by considering the force F with respect to the dynamics, and may calculate the available velocity area of the host ship including the velocity v and position vector p of the host ship by calculating the velocity v and position vector p of the host ship by using the calculated acceleration a of the host ship.

In addition, the processor 14 calculates the available velocity area of the host ship with respect to the curvature velocity of the host ship. In detail, the processor 14 may calculate the available velocity area of the host ship based on a velocity vector with respect to the movement direction of the host ship, a velocity vector with respect to a direction perpendicular to the movement direction of the host ship, and an angular velocity vector of the host ship.

In addition, the processor 14 may calculate the available velocity area of the host ship according to Equations 4 to 10 below.

$$u_{n+1} = u_n + u'_{max}\Delta t \rightarrow u_n = u_{des} \quad \text{[Equation 4]}$$

$$r_{n+1} = r_n + r'_{max}\Delta t \rightarrow r_n = r_{des} \text{ or } r_{max} \quad \text{[Equation 5]}$$

$$u_o = u_{n+1}\cos\Psi_n - v_{n+1}\sin\Psi_n \quad \text{[Equation 6]}$$

$$v_o = u_{n+1}\sin\Psi_n + v_{n+1}\cos\Psi_n \quad \text{[Equation 7]}$$

$$X_{n+1} = X_n + u_o\Delta t \quad \text{[Equation 8]}$$

$$Y_{n+1} = Y_n + v_o\Delta t \quad \text{[Equation 9]}$$

$$\Psi_{n+1} = \Psi_n + r_{n+1}\Delta t \quad \text{[Equation 10]}$$

Referring to Equations 4 to 10, the processor 14 may calculate the available velocity area of the host ship based on a velocity vector $u_n$ with respect to the movement direction of the host ship, a velocity vector $v_n$ with respect to a direction perpendicular to the movement direction of the host ship, and an angular velocity vector $r_n$ of the host ship. Here, a desired velocity value $u_{des}$ of the host ship, a desired angular velocity value $r_{des}$ of the host ship, a maximum value $r_{max}$ of the angular velocity vector of the host ship, a maximum value $r'_{max}$ of the angular acceleration vector of the host ship, and a maximum value $u'_{max}$ of the acceleration vector of the host ship may be set by an input from a user or a developer, considering the state of the host ship.

The processor 14 may calculate the available velocity area of the host ship with respect to the curvature velocity of the host ship, by obtaining a corresponding predicted x-coordinate value $X_{n+1}$, predicted y-coordinate value $Y_{n+1}$, and predicted direction value $\psi_{n+1}$ of the host ship by using the set desired velocity value $u_{des}$, desired angular velocity value $r_{des}$, maximum value $r_{max}$ of the angular velocity vector, maximum value $r'_{max}$ of the angular acceleration vector, and maximum value $u'_{max}$ of the acceleration vector of the host ship.

In operation S120, the processor 14 calculates a velocity obstacle area where there is a possibility of collision between an object and the host ship, based on object information.

The velocity obstacle area includes a set of all velocities and directions of the host ship that may cause a collision with the object, assuming that the object maintains its current velocity and current direction.

In addition, as described above, the processor 14 may calculate the velocity obstacle area where there is a possibility of collision between the object and the host ship, based on the object information, but the present disclosure is not limited thereto. In other words, the processor 14 may calculate a possible collision area of the object and the host ship, based on the object information. Here, the possible collision area is a broader set of concepts than the velocity obstacle area, and refers to an area where an object and host ship may collide with each other. For example, the possible collision area may include, in addition to the velocity obstacle area described above, Artificial Potential Field (APF), limited circle method, Dynamic Window Approach (DWA), A* algorithm (pronounced as A-star), θ* algorithm (pronounced as theta-star), and the like.

In addition, the processor 14 may calculate the velocity obstacle area based on sensing information of an object obtained from a sensor. In detail, the processor 14 may obtain the sensing information of the object by using a plurality of sensors. In addition, the processor 14 may integrate sensing information obtained from the plurality of sensors. In addition, the processor 14 may calculate the velocity obstacle area based on the integrated sensing information and information about the velocity and direction of the host ship.

In operation S130, the processor 14 calculates a collision risk based on the available velocity area, the velocity obstacle area, and a preset weight. The collision risk includes a value calculated by applying a preset weight for each area to an area where the available velocity area and the velocity obstacle area overlap each other. A detailed method of calculating a collision risk will be described below.

Meanwhile, the preset weight may be set based on the current velocity and current direction of the host ship. For example, the weight may be set to increase as the degree to which at least one of the velocity and the movement direction is changed increases or decreases, assuming that the current state of the host ship (e.g., the current velocity or the current direction of the host ship) is maintained.

Hereinafter, an available velocity area of a host ship according to an embodiment of the present disclosure will be described with reference to FIG. 2.

Figure 2:
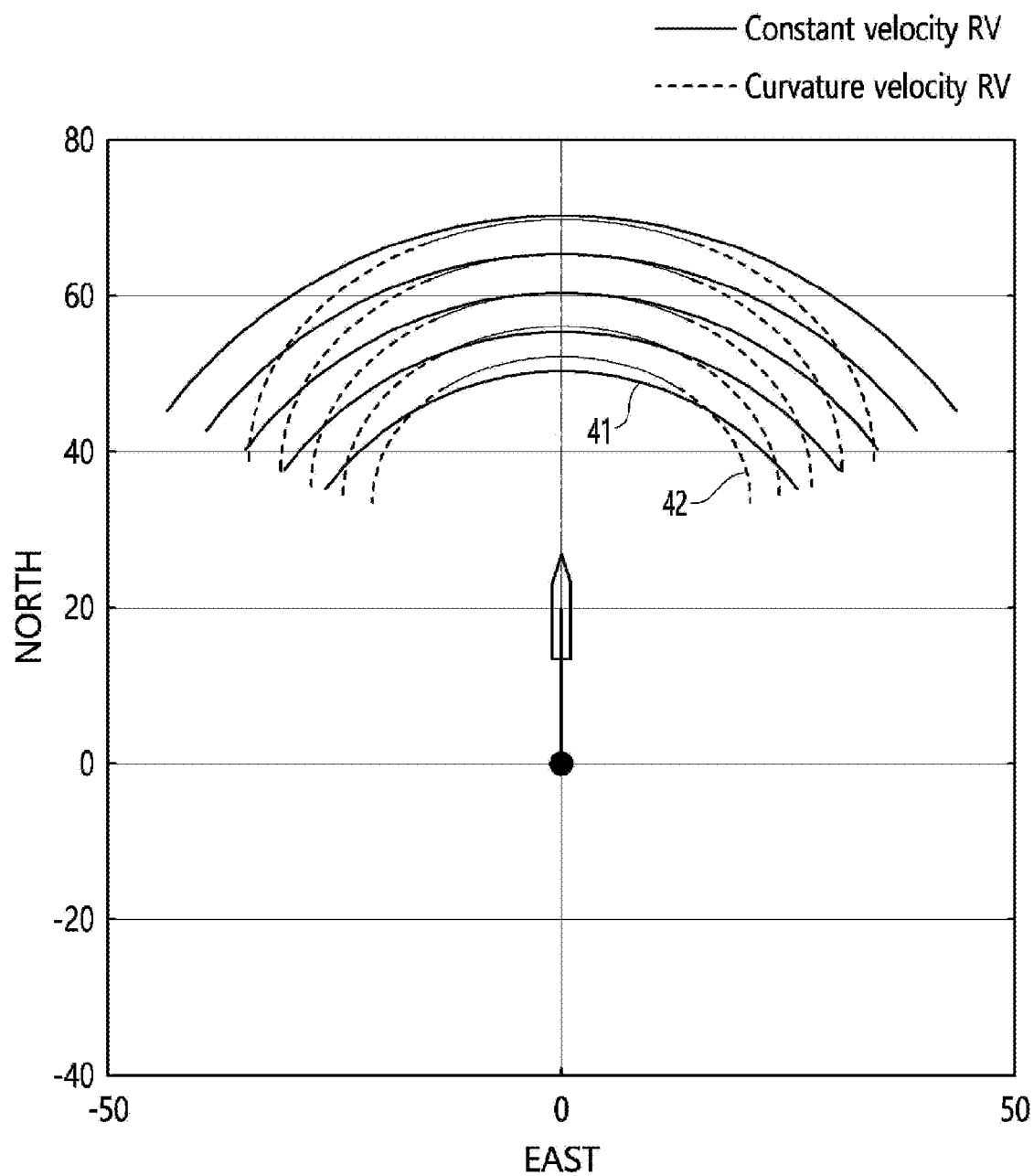
FIG. 2 is a diagram for describing an available velocity area of a host ship with respect to the maneuvering performance of the host ship, according to an embodiment.

FIG. 2 is a diagram for describing an available velocity area of a host ship with respect to the maneuvering performance of the host ship, according to an embodiment.

FIG. 2 shows an available velocity area of the host ship (a curvature velocity RV 42) with respect to the curvature velocity of the host ship, and an available velocity area of the host ship (a constant velocity RV 41) with respect to the constant velocity of the host ship.

In FIG. 2, the solid lines 41 indicates area where the host ship may be potentially located after moving from the current position for a predetermined time using available various velocities. For example, from among the five solid lines, the solid line closest to the host ship may indicate an area that the host ship may be potentially located after moving using a first speed, and the solid line second closest to the host ship may indicate an area that the host ship may be potentially located after moving using a second speed, which is higher than the first speed, when assuming that the host ship moves for the same predetermined time. Similarly, the solid line farthest from the host ship may indicate an area that the host ship may be potentially located after moving using a highest speed available to the host ship when assuming that the host ship moves for the same predetermined time.

The available velocity area of the host ship (the constant velocity RV 41) with respect to the constant velocity of the host ship may be generated by considering only the velocity of the host ship, while the available velocity area of the host ship (the curvature velocity RV 42) with respect to the curvature velocity of the host ship may be generated by additionally considering the angular velocity of the host ship together with the constant velocity of the ship. Thus, an available velocity area of the host ship may be calculated by reflecting the flow of energy according to a change in the direction of the host ship. Thus, the available velocity area of the host ship (the curvature velocity RV 42) with respect to the curvature velocity of the host ship has higher accuracy than the available velocity area of the host ship (the constant velocity RV 41) with respect to the constant velocity of the host ship. The available velocity area of the host ship (the curvature velocity RV 42) with respect to the curvature velocity of the host ship, for example, derives a result that is closer to an available velocity area based on a maneuvering modeling group (MMG) model.

For convenience of description, in FIG. 2, the position of the host ship according to the available velocity area 42 of the host ship with respect to the curvature velocity of the host ship, and the position of the host ship according to the available velocity area 41 of the host ship with respect to the constant velocity of the host ship are exemplarily depicted (e.g., using five different solid lines and five different dotted lines). However, the available velocity area 42 of the host ship with respect to the curvature velocity of the host ship and the available velocity area 41 of the host ship with respect to the constant velocity of the host ship are not limited to the indication method shown in FIG. 2. They may be depicted according to embodiments of various indication methods. The host vehicle may be equipped with various sensors to detect the host vehicle's velocity and position such as velocity sensor, and GPS, etc.

Also, a method of calculating an available velocity area of a host ship described above with reference to FIG. 2 is an example. The methods of calculating an available velocity area of a host ship are not limited to the above.

Hereinafter, a method of calculating a velocity obstacle area according to an embodiment of the present disclosure will be described with reference to FIG. 3.

Figure 3:
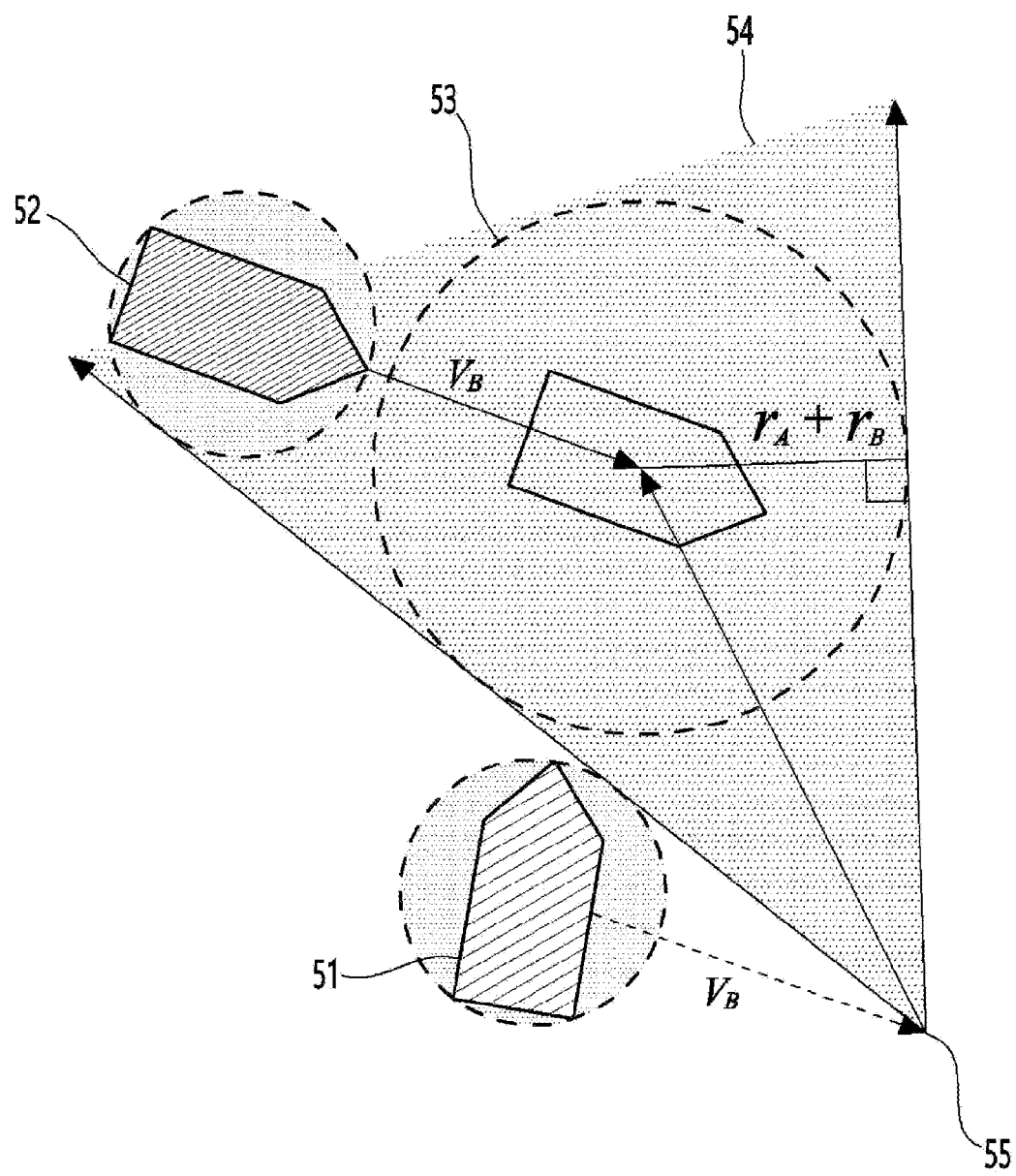
FIG. 3 is a diagram for describing a velocity obstacle area according to an embodiment.

Referring to FIG. 3, a velocity obstacle area 54 may be calculated based on the velocity of a host ship 51 and the velocity of an obstacle 52. The obstacle 52 may be a moving object such as a ship. The velocity obstacle area 54 of the host ship 51 with respect to the obstacle 52 includes a set of velocity vectors of the host ship 51 that may result in collision with the obstacle 52 assuming the obstacle 52 maintains its current speed and current direction. Here, the obstacle 52 may be one of objects detected based on object information. The host ship may be equipped with various sensors such as a camera and Lidar to detect such objects.

When the obstacle 52 moves at a velocity $V_B$, the position of the obstacle 52 after moving for a set time may be calculated. An obstacle area 53 of the obstacle 52 may be set based on the calculated position of the obstacle 52. For example, the obstacle area 53 may be set as a circular area by considering at least one of a size $r_A$ of the host ship 51, a size $r_B$ of the obstacle 52, and a preset safety range, having the calculated position of the obstacle 52 at its center. The velocity obstacle area 54 may be calculated by connecting a position 55 of the host ship 51 after moving at the velocity $V_B$ for a set time, with points circumscribing the obstacle area 53. The velocity $V_B$ may be equal to the velocity of the obstacle 52, and the velocity obstacle area 54 may be generated to reflect the movement of obstacle 52. The velocity obstacle area 54 may be determined based on the position 55 where the host ship 51 is predicted to be located after moving with a preset velocity and direction for a preset time, and external tangent lines of the obstacle area 53.

For example, the velocity obstacle area 54 may be defined as an area between two external tangent lines.

Meanwhile, an example of a method for calculating a velocity obstacle area is described above with reference to FIG. 3, but examples of methods of calculating a velocity obstacle area are not limited to the above.

Figure 4:
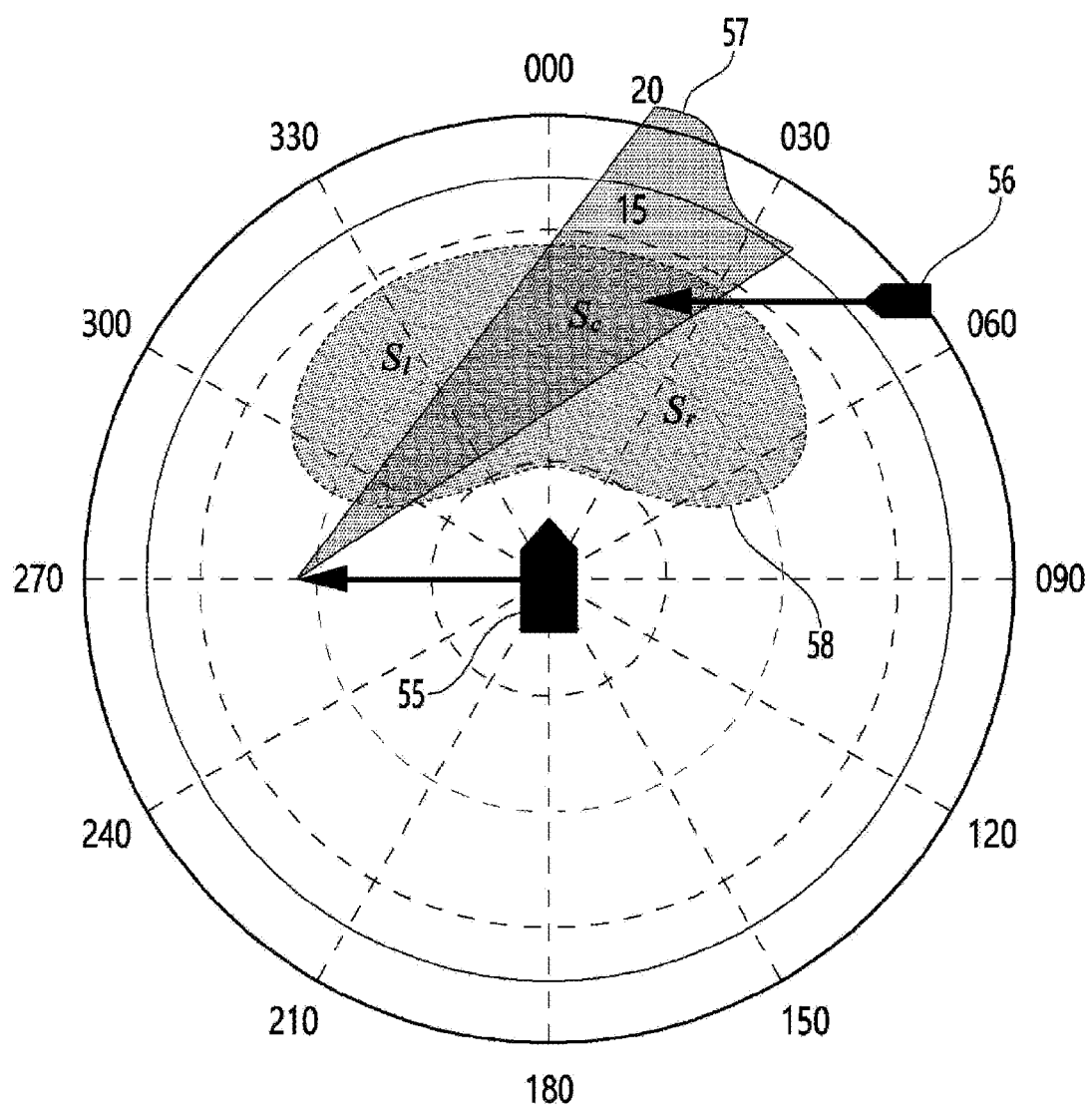
FIG. 4 is a diagram for describing a method of determining an available avoidance velocity area, according to an embodiment of the present disclosure.

FIG. 4 is a diagram for describing a method of determining an available avoidance velocity area, according to an embodiment of the present disclosure.

Referring to FIG. 4, a velocity obstacle area 57 of the host ship 55 with respect to an obstacle 56 is depicted. A combination of the $S_l$, $S_c$, $S_r$ is an available velocity area 58 of the host ship 55. The area $S_c$ overlaps the velocity obstacle area 57. The areas $S_l$ and $S_r$ that do not overlap the velocity obstacle area 57 may be derived from an available velocity area 58 of a host ship and may be referred to as an available avoidance velocity.

In addition, the available velocity area 58 may be calculated through the method described above with reference to FIG. 2, and the velocity obstacle area 57 may be calculated through the method described above with reference to FIG. 3, but the present disclosure is not limited thereto.

Hereinafter, preset weights according to an embodiment of the present disclosure will be described with reference to FIG. 5.

Figure 5:
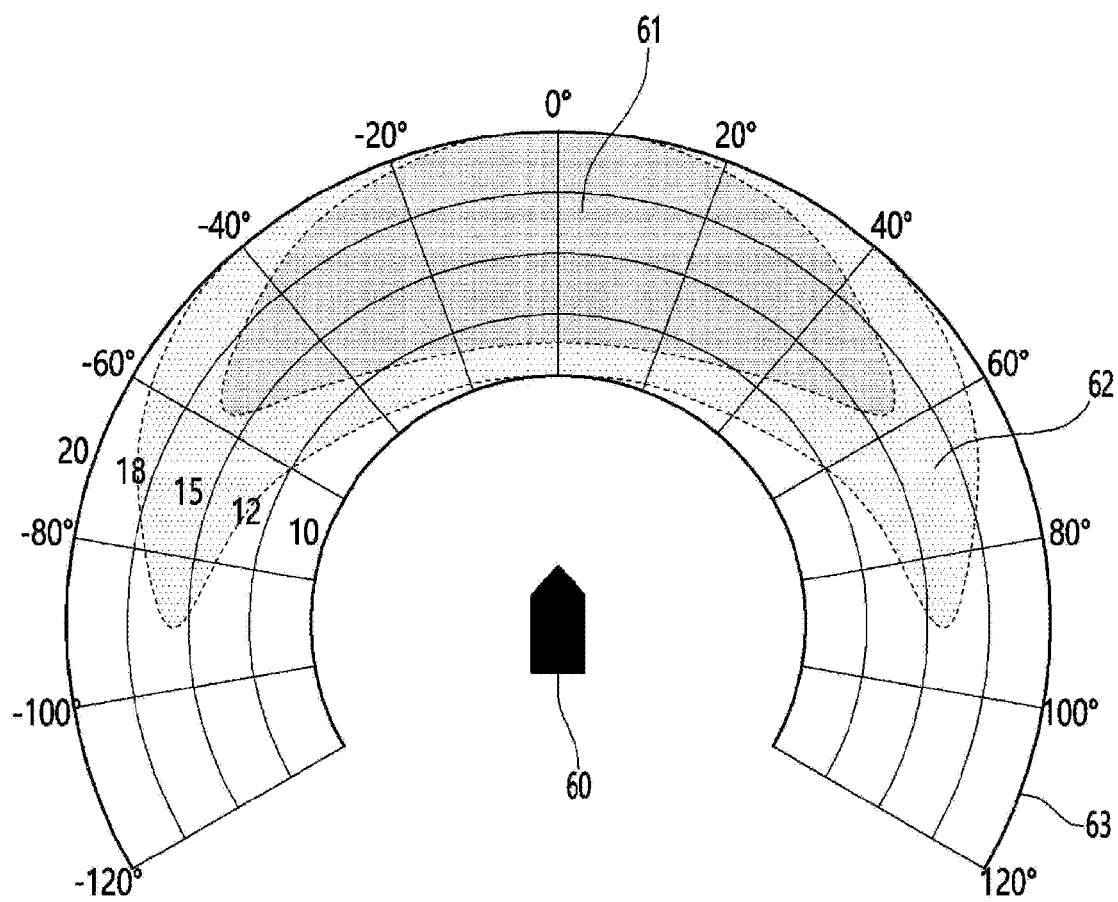
FIG. 5 is a diagram for describing preset weights according to an embodiment.

FIG. 5 shows a preset weight for each area within an available velocity area. FIG. 5 shows that, based on the current state of a host ship 60, the direction of the host ship may be changed in the range of 120 degrees to −120 degrees, and the velocity of the host ship may be changed in the range of 10 to 20, but this is for illustrative purposes only and the present disclosure is not limited thereto. In addition, of course, the weights may be indicated in a different form.

For example, the weight may be a value that is set according to the degree to which at least one of the velocity and movement direction of the host ship is changed, assuming that the current state of the host ship is maintained other than the velocity and the movement direction. Based on the velocity and direction of the host ship, different weights may be set for respective sections of the available velocity area. For example, the weight for an area where both the velocity and direction of the host ship are not changed may be set to the highest value, and the weight for an area where only the direction of the host ship is changed may be set to a relatively low value. Alternatively, the weight for the area where both the velocity and direction of the host ship are not changed may be set to the lowest value, and the weight for the area where only the direction of the host ship is changed may be set to a relatively high value.

Referring to FIG. 5, available velocity areas 61, 62, and 63 having different weights may be separate areas that do not overlap each other. For example, the available velocity area 62 may be an area inside an area indicated by dotted lines, excluding the available velocity area 61. In more detail, a weight for the available velocity area 61 when the current state of the host ship is maintained may be set to the lowest value. As another example, a weight for the available velocity area 62 when the velocity of the host ship is maintained but the movement direction is changed may be set to be higher than a weight for the available velocity area 61 when the current state of the host ship is maintained. As another example, a weight for the available velocity area 63 when both the velocity and movement direction of the host ship are changed may be set to be the highest compared to the examples described above.

In addition, the preset weights may be indicated in different indication forms (e.g., colors or numeric characters) based on the set values. For example, a lower weight may be represented by a lower number or a color closer to blue for the user. Conversely, a higher weight may be represented by a higher number or a color closer to red for the user. However, examples of methods of indicating preset weights are not limited to the above.

As collision risks are calculated by using the preset weights of FIG. 5, the collision risk for the available velocity area 61 may be calculated to be greater than the collision risk for the available velocity area 62 based on different weights given to each of them. In addition, the collision risk for the available velocity area 62 may be calculated to be greater than the collision risk for the available velocity area 63 based on different weights given to each of them.

According to an embodiment of the present disclosure, by calculating collision risks considering preset weights, the user may navigate while avoiding objects around the host ship but minimally changing the velocity and direction of the host ship.

Meanwhile, an example of preset weights is described above with reference to FIG. 5, but examples of preset weights are not limited to the above. For example, the preset weights may be indicated in various indication methods other than the indication method shown in FIG. 5.

Hereinafter, another example of a method by which the processor 14 calculates a collision risk of a ship will be described with reference to FIG. 6.

Figure 6:
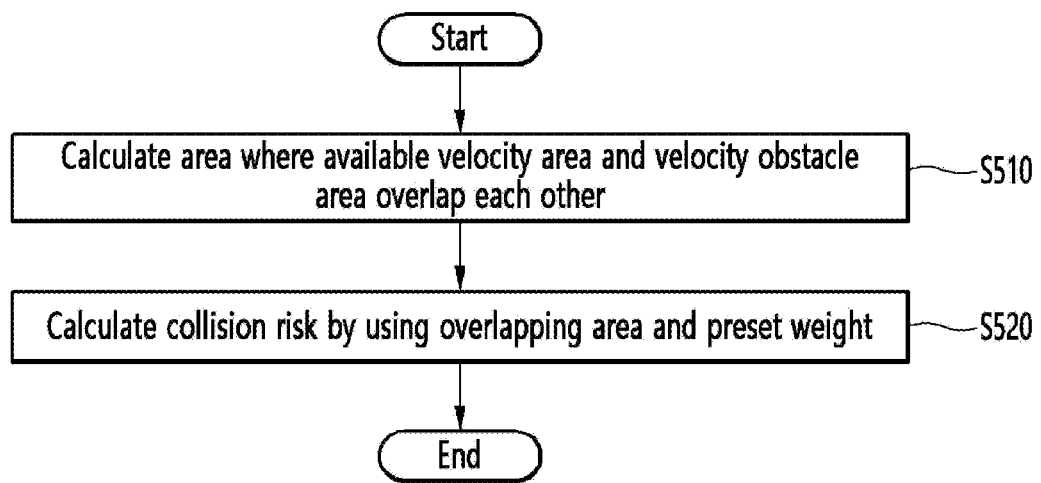
FIG. 6 is a flowchart for describing another example of a method of calculating a collision risk of a ship, according to an embodiment.

FIG. 6 is a flowchart for describing another example of a method of calculating a collision risk of a ship, according to an embodiment. Operations S510 and S520 of FIG. 6 may be other examples of operation S130 of FIG. 1 described above. In other words, operations S510 and S520 of FIG. 6 may be performed after operations S110 to S120 of FIG. 1.

In operation S510, the processor 14 calculates an area where an available velocity area and a velocity obstacle area overlap each other. Each of the available velocity area and the velocity obstacle area may include the velocity of the host ship according to the position of the host ship after a preset time. Thus, the area where the available velocity area and the velocity obstacle area overlap each other may include the velocity of the host ship according to a point where the host ship and an object may collide with each other after a preset time.

In operation S520, the processor 14 calculates a collision risk by using the overlapping area and a preset weight. For example, the processor 14 may calculate a collision risk for the overlapping area by applying a preset weight to the overlapping area. In detail, the processor 14 may calculate a normal distribution value of each of a velocity vector and an angular velocity vector of the host ship included in the overlapping area. In addition, the processor 14 may calculate a collision risk for each of areas included in the overlapping area by multiplying each of the calculated normal distribution value of the velocity vector of the host ship and the normal distribution value of the angular velocity vector of the host ship, by a preset weight. In addition, the processor 14 may calculate a final collision risk by adding up the collision risks for the respective areas included in the overlapping area.

By applying the preset weights to the overlapping area, the processor 14 may calculate a collision risk according to the degree to which the overlapping area deviates from the current velocity and current direction of the host ship. For example, the processor 14 may calculate a collision risk for each of a case where the overlapping area exists at a position at which the current velocity and current direction of the host ship are maintained, and a case where the overlapping area exists at a position at which at least one of the current velocity and current direction of the host ship is changed. For example, the collision risk for the case where the overlapping area exists at a position at which the current velocity and current direction of the host ship are maintained may be calculated to be greater than the collision risk for the case where the overlapping area exists at a position at which at least one of the current velocity and current direction of the host ship is changed by assigning different weights.

In addition, the processor 14 may generate warning information about a collision between one or more objects and the host ship, based on a comparison of a collision risk with a preset value. For example, when the collision risk is greater than a preset first threshold value, the processor 14 may generate first warning information at an alarm level. In addition, when the collision risk is greater than a preset second threshold value, the processor 14 may generate second warning information at a warning level. Here, the second threshold value refers to a value that is set to be greater than the first threshold value.

The first warning information may include information at the alarm level regarding a collision between an object and the host ship. Also, the first warning information may include information about a solution (e.g., an avoidance route or an engine control command) according to the calculated collision risk, information about a failure to activate a collision-avoidance (CA) maneuver of the ship, and the like.

The second warning information may include information at the warning level regarding a collision between an object and the host ship. The second warning information may include information for informing the user of a more dangerous situation than the above-described first warning. For example, the second warning information may include warning information about an early change in a course for CA of the ship, warning information about a change in a CA course, warning information indicating a CA route being outside an cross-track distance (XTD) defined in an electronic chart display and information system (ECDIS), and the like.

According to an embodiment of the present disclosure, a calculated collision risk may be compared with a preset threshold value to generate various pieces of warning information according to the level of the collision risk, and provide the information to the user.

Hereinafter, an example of displaying information obtained or calculated by the processor 14 will be described with reference to FIG. 7.

Figure 7:
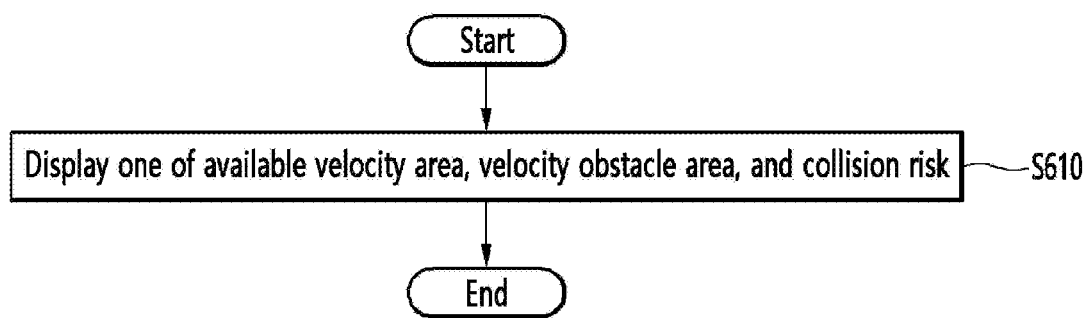
FIG. 7 is a flowchart for describing an example in which a processor displays one of an available velocity area, a velocity obstacle area, and a collision risk, according to an embodiment.

FIG. 7 is a flowchart for describing an example in which a processor displays one of an available velocity area, a velocity obstacle area, and a collision risk, according to an embodiment. Operation S610 of FIG. 7 is an embodiment that may be additionally performed after operation S130 of FIG. 1 described above. In other words, operation S610 of FIG. 7 may be performed after operations S110 to S130 of FIG. 1.

In operation S610, a display unit 150 (see FIG. 13) may display one or more of an available velocity area, a velocity obstacle area, and a collision risk. There is no limit to the method of displaying a calculated available velocity area, velocity obstacle area, and collision risk. Accordingly, a user operating a ship may more easily respond to a dangerous situation by making a follow-up action plan through the displayed information by intuitively checking information about a collision between an object and the host ship (e.g., an available velocity area, a velocity obstacle area, or a collision risk).

Hereinafter, an example of displaying at least one of an available velocity area, a velocity obstacle area, and a collision risk according to an embodiment of the present disclosure will be described with reference to FIGS. 8A and 8B.

Figure 8:
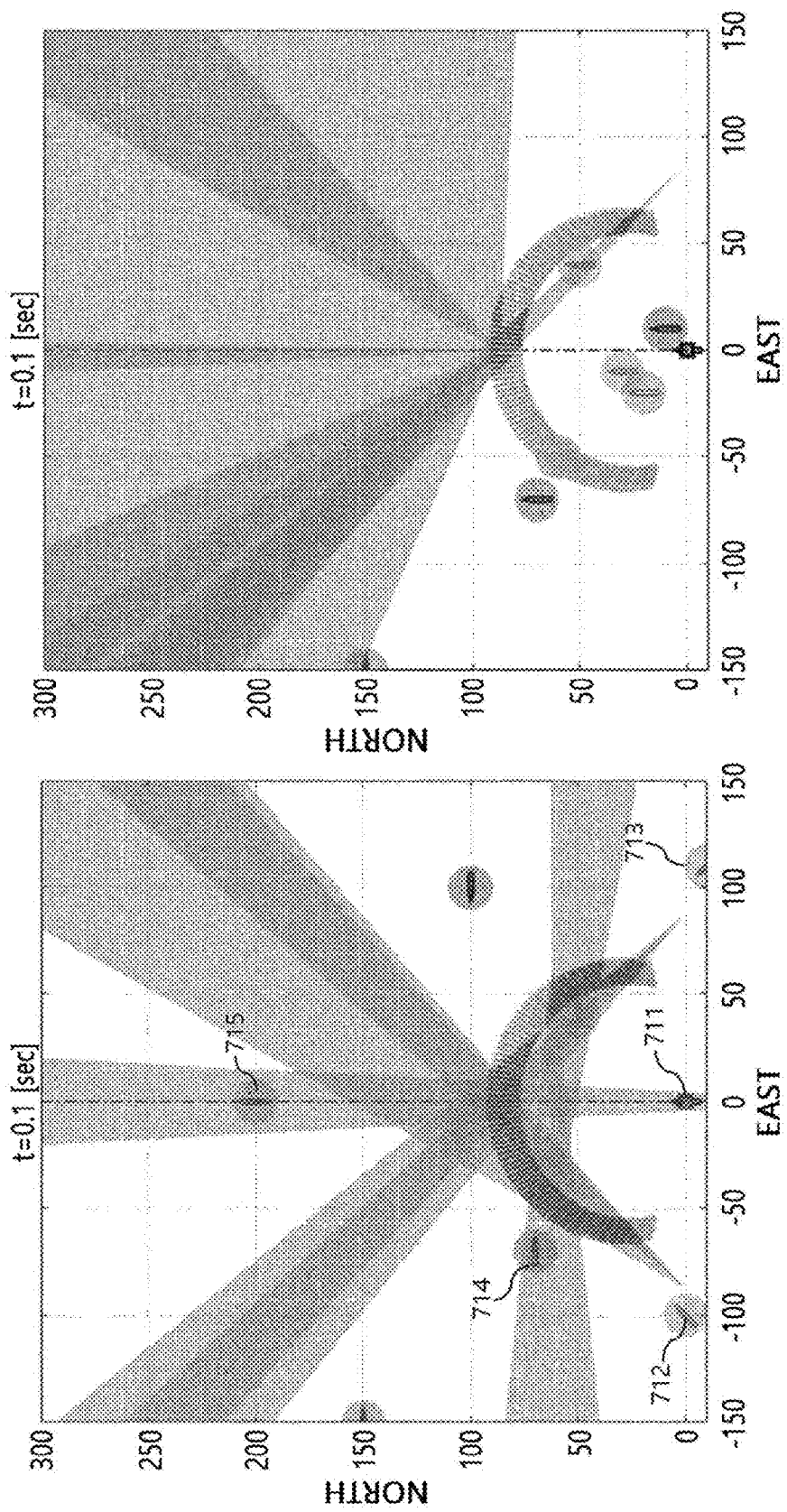
FIG. 8A and FIG. 8B are diagrams for describing an example of displaying at least one of an available velocity area, a velocity obstacle area, and a collision risk, according to an embodiment.

For example, as shown in FIG. 8A, when a plurality of other ships 712, 713, 714 and 715 are traveling in directions different from the movement direction of the host ship 711, the display unit 150 may display an available velocity area of the host ship 711, a velocity obstacle area with respect to each of the plurality of other ships 712, 713, 714 and 715, and an available avoidance velocity area obtained by excluding the velocity obstacle areas from the available velocity area of the host ship 711. In this case, because the host ship 711 and the plurality of other ships 712, 713, 714 and 715 differ from each other in movement direction, the velocity obstacle areas for the plurality of other ships 712, 713, 714 and 715 occupy large areas within the available velocity area of the host ship 711, and accordingly, the available avoidance velocity area of the host ship 711 is displayed to be small.

As another example, as shown in FIG. 8B, when the plurality of other ships are traveling in the same direction as the movement direction of the host ship, the display unit 150 may display an available velocity area of the host ship, a velocity obstacle area for each of the plurality of other ships, and an available avoidance velocity area obtained by excluding the velocity obstacle areas from the available velocity area of the host ship. In this case, because the movement directions of the plurality of other ships are the same as the movement direction of the host ship, the possibility of collision is significantly low. As shown in FIG. 8B, when the possibility of collision is significantly low, the available velocity area of the host ship and the available avoidance velocity area may be displayed to be similar to each other.

Hereinafter, an example of a method by which the processor 14 determines an avoidance route will be described with reference to FIG. 9.

Figure 9:
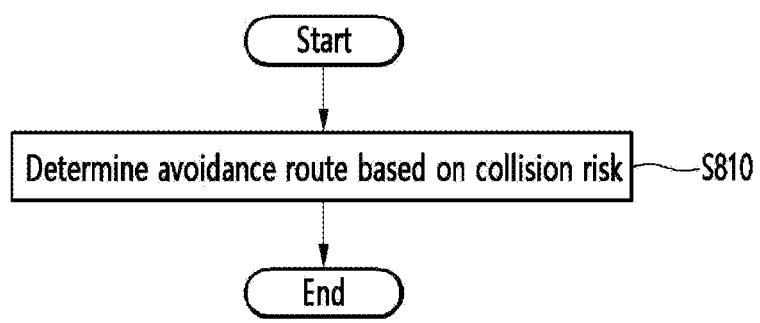
FIG. 9 is a flowchart for describing an example of a method of determining an avoidance route, according to an embodiment.

FIG. 9 is a flowchart for describing an example of a method of determining an avoidance route, according to an embodiment. Operation S810 of FIG. 9 is an embodiment that may be additionally performed after operation S130 of FIG. 1 described above. In other words, operation S610 of FIG. 9 may be performed after operations S110 to S130 of FIG. 1.

In operation S810, the processor 14 may determine an avoidance route based on a collision risk. An avoidance route with priority may be set for a lower calculated collision risk. For example, the processor 14 may provide the user with a plurality of avoidance route candidates by prioritizing them in descending order of collision risk. The user may select a desired avoidance route from among the plurality of avoidance route candidates provided.

In detail, the processor 14 may set avoidance route candidates of which the destinations are respective areas included in an available velocity area. For example, the processor 14 may set an avoidance route candidate for a destination that may be reached by changing at least one of the current velocity and current direction of the host ship, within the available velocity area.

In addition, the processor 14 may calculate collision risks for the set avoidance route candidates.

In addition, the processor 14 may select an avoidance route based on the calculated collision risks for the avoidance route candidates. For example, the avoidance route candidate with the lowest collision risk may be selected as the avoidance route.

Meanwhile, examples of methods of determining an avoidance route are not limited to the above.

In addition, the processor 14 may generate an avoidance route by using a tree structure. For example, the processor 14 may generate an avoidance route by generating, based on the collision risks, nodes of a tree structure to be located in descending order of collision risk. Alternatively, the processor 14 may generate an avoidance route by expanding a tree structure for a route from the departure point to the destination, based on the collision risks. However, examples of methods of generating an avoidance route by using a tree structure are not limited to the above.

Hereinafter, an example of an avoidance route generated by the processor 14 will be described with reference to FIG. 10.

Figure 10:
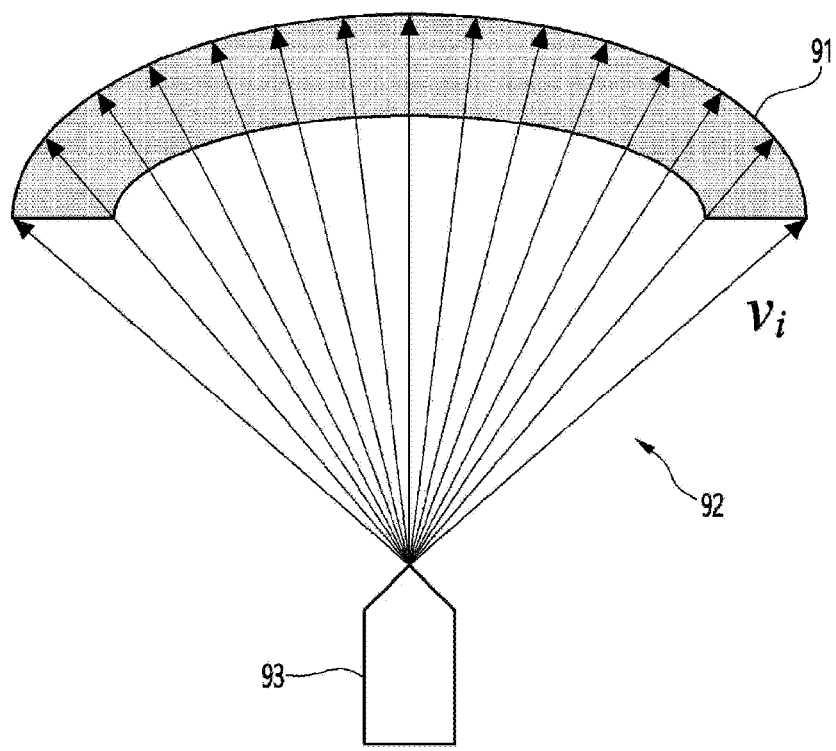
FIG. 10 is a diagram for describing an example of an avoidance route according to an embodiment.

FIG. 10 is a diagram for describing an example of an avoidance route according to an embodiment.

FIG. 10 shows an avoidance route 92 generated by the processor 14 based on collision risks of a host ship 93. The avoidance route 92 may be a route of which the starting point is the current position of the host ship 93 and the destination is a partial area of an available velocity area 91. Here, some areas of the available velocity area 91 may include areas obtained by excluding a velocity obstacle area or a possible collision area from the available velocity area 91.

A plurality of avoidance routes may be displayed to the user through a user terminal, and may be provided to the user in descending order of collision risk. Also, according to an embodiment, only one avoidance route with the lowest collision risk may be provided and displayed to the user.

Meanwhile, an example of generating and displaying an avoidance route is described above with reference to FIG. 10, but the present disclosure is not limited thereto.

Hereinafter, another example of a method by which the processor 14 determines an avoidance route will be described with reference to FIG. 11.

Figure 11:
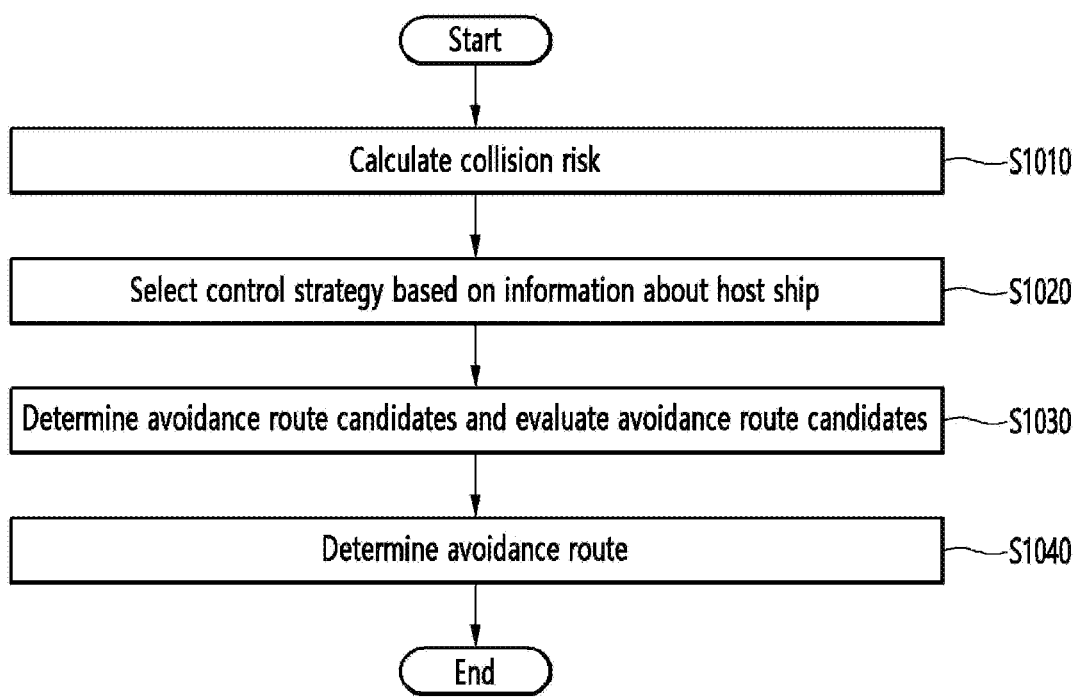
FIG. 11 is a flowchart for describing another example of a method of determining an avoidance route, according to an embodiment.

FIG. 11 is a flowchart for describing another example of a method of determining an avoidance route, according to an embodiment.

In operation S1010, the processor 14 may calculate a collision risk according to obtained sensing information. For example, the collision risk may be calculated through the method described above with reference to FIG. 1. As another example, according to object selection and tracked sensing information, the collision risk may be calculated according to a probability-based collision possibility by considering a proximity distance between the host ship and an object, a movement direction, overlapping of routes, and the like.

In addition, in operation S1020, the processor 14 may select a control strategy based on information about the host ship, according to the calculated collision risk. For example, when there is a marine structure ahead and thus the collision risk is significantly high, the host ship may set a bypass strategy by setting an avoidance route. On the contrary, when there is another ship ahead and that ship is smaller than the host ship, the other ship is expected to change its route to avoid the collision with the host ship in accordance with the International Regulations for Preventing Collisions at Sea, and thus, the host ship may select a control strategy that does not set a bypass route considering the maneuverability of the host ship.

In operation S1030, when the bypass strategy is selected, the processor 14 may determine avoidance route candidates and evaluate the avoidance route candidates. In addition, in operation S1040, the processor 14 may determine an avoidance route.

For example, when there is a marine structure ahead near the sea level, such as a coral reef, the bottom of the hull is likely to collide with the marine structure, and thus, a bypass route that avoids the marine structure with a longer distance may be determined as the avoidance route from among a plurality of bypass routes. Conversely, when there is no marine structure ahead near the sea level, in order to reduce fuel consumption, the shortest bypass route may be determined as the avoidance route.

For example, the processor 14 may consider a plurality of avoidance route candidates and determine the optimal avoidance route candidate from among them as the avoidance route. An avoidance route candidate considering the International Regulations for Preventing Collisions at Sea, an avoidance route candidate for minimum fuel consumption, an avoidance route candidate with the highest probability of resolving a collision, and the like may be derived according to the navigation situation, and the optimal avoidance route may be determined by using a plurality of parameters according to the current situation of the host ship, and presented through the display unit 150. In other words, the processor 14 may set collision avoidance routes according to a plurality of scenarios, determine the optimal avoidance route from among them, and provide it to the user.

Thus, the processor 14 may calculate collision risks according to the presence or absence and type of an object by using fused sensing information, and finally determine the avoidance route by considering the calculated collision risks and the maneuverability of the host ship.

The processor 14 may determine a final avoidance route by additionally considering marine environment information in addition to the collision risks.

Hereinafter, an example of a method by which the processor 14 generates an engine control command according to an avoidance route will be described with reference to FIG. 12.

Figure 12:
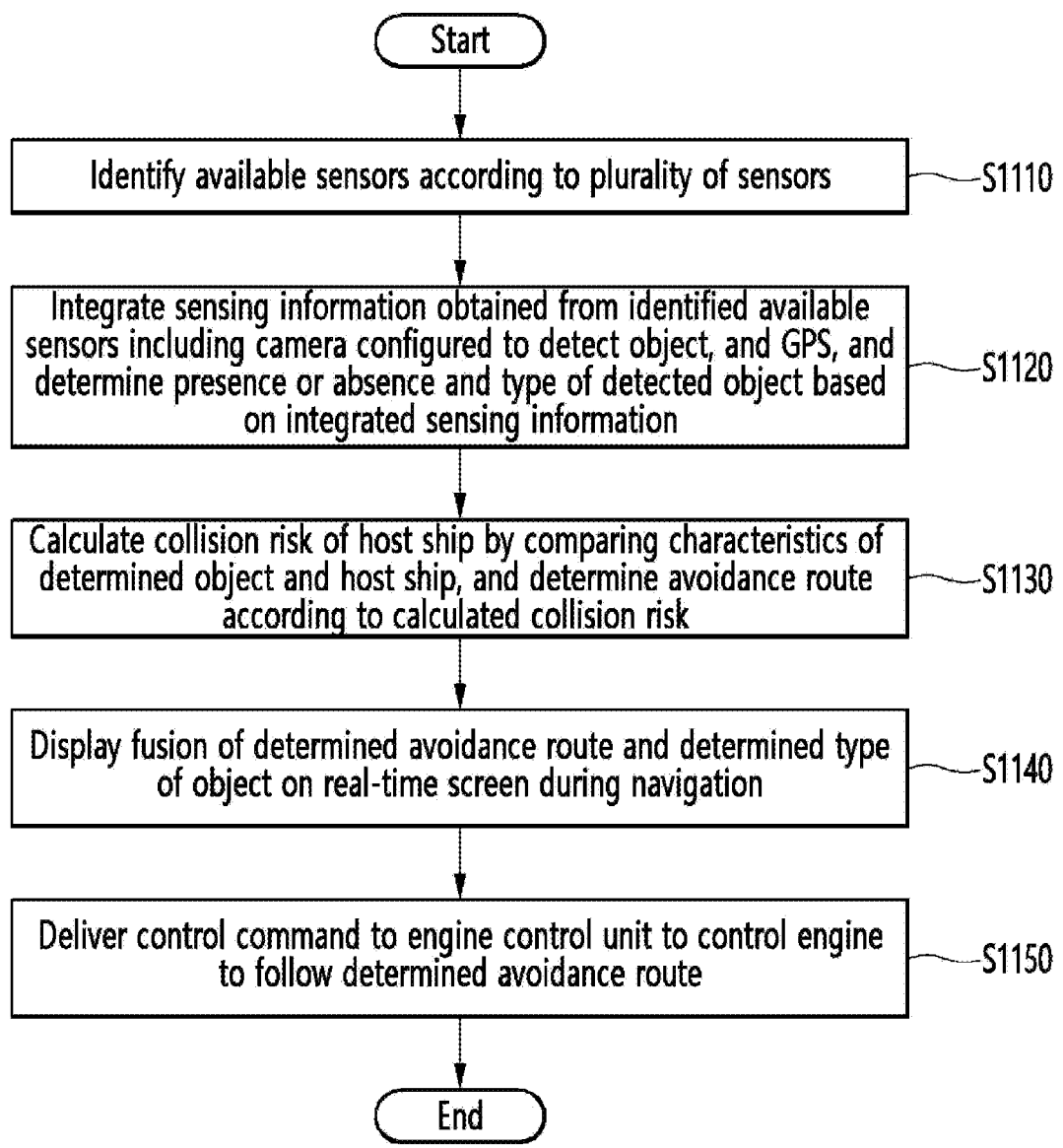
FIG. 12 is a flowchart for describing an example of a method of generating an engine control command according to an avoidance route, according to an embodiment of the present disclosure.

FIG. 12 is a flowchart for describing an example of a method of generating an engine control command according to an avoidance route, according to an embodiment of the present disclosure.

In operation S1110, the processor 14 identifies available sensors according to a plurality of sensors.

In operation S1120, the processor 14 integrates sensing information obtained from the identified available sensors including a camera configured to detect an object, and a GPS, and determines the presence or absence and type of a detected object based on the integrated sensing information.

In operation S1130, the processor 14 calculates a collision risk of the host ship by comparing characteristics of the determined object and the host ship, and determines an avoidance route according to the calculated collision risk.

For example, the processor 14 may generate a plurality of avoidance route candidates and determine an optimal avoidance route by using a plurality of parameters according to the current situation of the host ship, from among the generated avoidance route candidates. In other words, it is not that the same route is always determined in the same situation, but that the processor 14 may search for and determine a flexible avoidance route according to the current situation of the host ship by considering a plurality of parameters according to the current situation of the host ship.

In operation S1140, the processor 14 displays a fusion of the determined avoidance route and the determined type of the object on a real-time screen during navigation.

For example, the processor 14 may receive the presence or absence and type of the object detected based on the integrated sensing information, or the determined avoidance route, and output it as an augmented reality image.

According to an embodiment of the present disclosure, rather than simply displaying the generated route on a screen, augmented reality may be used such that the user may check the sensing information or the generated route while keeping eyes forward.

In operation S1150, the processor 14 delivers a control command to an engine control unit to control an engine of the ship to follow the determined avoidance route.

For example, the processor 14 may generate and deliver an engine control command to perform corresponding engine control to follow the determined avoidance route without a separate user input.

In other words, the processor 14 may display the avoidance route and the detected object on a real-time screen, while generating and delivering the corresponding engine control commands to allow the host ship to navigate according to the avoidance route.

Figure 13:
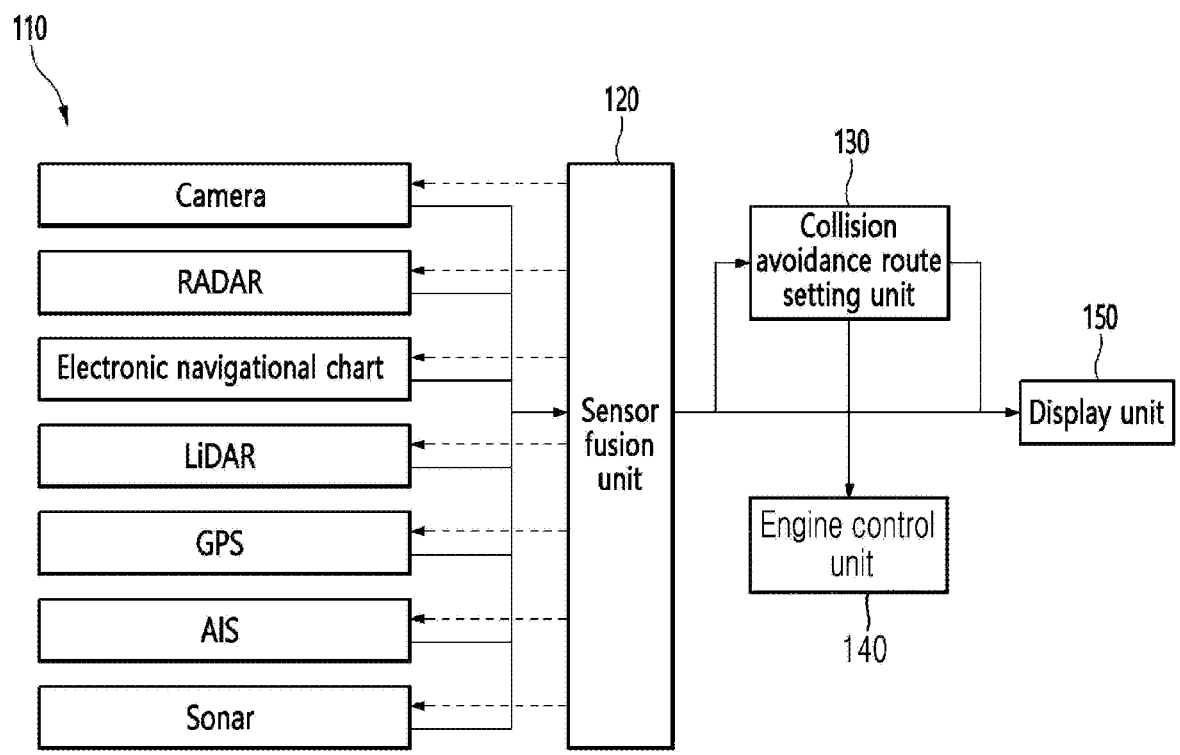
FIG. 13 is a block diagram briefly illustrating an example of a device for calculating a collision risk of a ship, according to an embodiment of the present disclosure.

FIG. 13 is a block diagram briefly illustrating an example of a device for calculating a collision risk of a ship, according to an embodiment of the present disclosure.

As illustrated in FIG. 13, the device for calculating a collision risk of a ship according to an embodiment of the present disclosure may include a sensor unit 110 including one or more sensors installed in the host ship to detect at least one object, a sensor fusion unit 120 configured to identify the types of a plurality of sensors, integrate sensing information of the plurality of sensors, and obtain at least one piece of object information based on the integrated sensing information, and a collision avoidance route setting unit 130 configured to calculate an available velocity area of the host ship with respect to the maneuvering performance of the host ship, calculate, based on object information, a possible collision area (e.g., a velocity obstacle area) between at least one object and the host ship, and calculate a collision risk based on an available velocity area, a possible collision area, and preset weights. In addition, the device for calculating a collision risk of a ship may further include the display unit 150 configured to display at least one of an available velocity area, a possible collision area, and a collision risk.

In addition, the collision avoidance route setting unit 130 may determine an avoidance route based on a collision risk. In addition, the display unit 150 may display at least one of the determined avoidance route and the type of an object.

In addition, the display unit 150 may receive the presence or absence and type of an object detected based on integrated sensing information, or the determined avoidance route, and output it as an augmented reality image.

In addition, the collision avoidance route setting unit 130 may generate an engine control command according to the determined avoidance route.

In addition, the device for calculating a collision risk of a ship may further include an engine control unit 140 configured to convert an engine control command of the collision avoidance route setting unit according to an engine state of the host ship. When the engine control unit 140 simultaneously receives a user input and a control command of the collision avoidance route setting unit, the engine control unit 140 may control the engine by giving the user input a higher priority than the control command of the collision avoidance route setting unit.

In addition, the device for calculating a collision risk of a ship according to an embodiment of the present disclosure may include the sensor unit 110, the sensor fusion unit 120, the collision avoidance route setting unit 130, and the display unit 150. The sensor unit 110 is installed in the host ship and includes a plurality of navigation-related sensors including at least a camera 111 and a GPS 115. The sensor fusion unit 120 is configured to identify the types of the plurality of sensors, integrate sensing information from the identified sensors to detect an object, and determine the presence or absence and type of the detected object based on the integrated sensing information. The collision avoidance route setting unit 130 is configured to calculate a collision risk of the host ship by comparing characteristics of the determined object and the host ship, and determine an avoidance route according to the calculated collision risk. The display unit 150 is configured to display a fusion of the determined avoidance route and the determined type of the object on a real-time screen during navigation.

For embodiment, the sensor fusion unit 120 may identify the types of the plurality of sensors, and integrate sensing information from the camera 111, the GPS 115, and a sensor that is identified as having been installed to detect an object.

The plurality of sensors according to an embodiment of the present disclosure may include at least one of a radio detection and ranging (RADAR) 112, an electronic navigational chart (ENC) 113, a light-detection-and-ranging (LiDAR) 114, an automatic identification system (AIS) 116, a sonar 117, an inertial measurement unit (IMU) (not shown), and a host ship database (DB) (not shown). The plurality of sensors that may be installed in the host ship are not limited thereto, and the types of sensors installed in the ship are not limited.

In addition, the sensor fusion unit 120 according to an embodiment of the present disclosure may register in advance the types of sensors that are included in the plurality of sensors and thus usable, as indicated by dotted lines of FIG. 13.

In other words, different sensors may be installed for each ship, and the sensor fusion unit 120 may register in advance sensors that are installed in the ship and thus usable, collect only sensor data from the available sensors, and fuse the sensing information.

For example, when the host ship is a small ship equipped with the camera 111, the LiDAR 114, and the GPS 115, the sensor fusion unit 120 may detect an object near the position of the host ship by obtaining an image from the camera 111 and point cloud data from the LiDAR 114 and the position of the host ship received by the GPS 115, then integrate the detection data from the camera 111 and the LiDAR 114 if detected objects are a same object, and leave the detection data from the camera 111 and the LiDAR 114 if the detected objects are different objects. For example, when the camera 111 and the LIDAR 114 detect other ships, and each detected ship is within a preset range, the sensor fusion unit 120 may determine that the other ships are the same ship and thus fuse pieces of detected sensor information into one, the collision avoidance route setting unit 130 may set only one avoidance route that bypasses such the same ship.

The camera 111 and the LIDAR 114 may detect obstacles including other ships, coastal structures, and the like.

Figure 15:
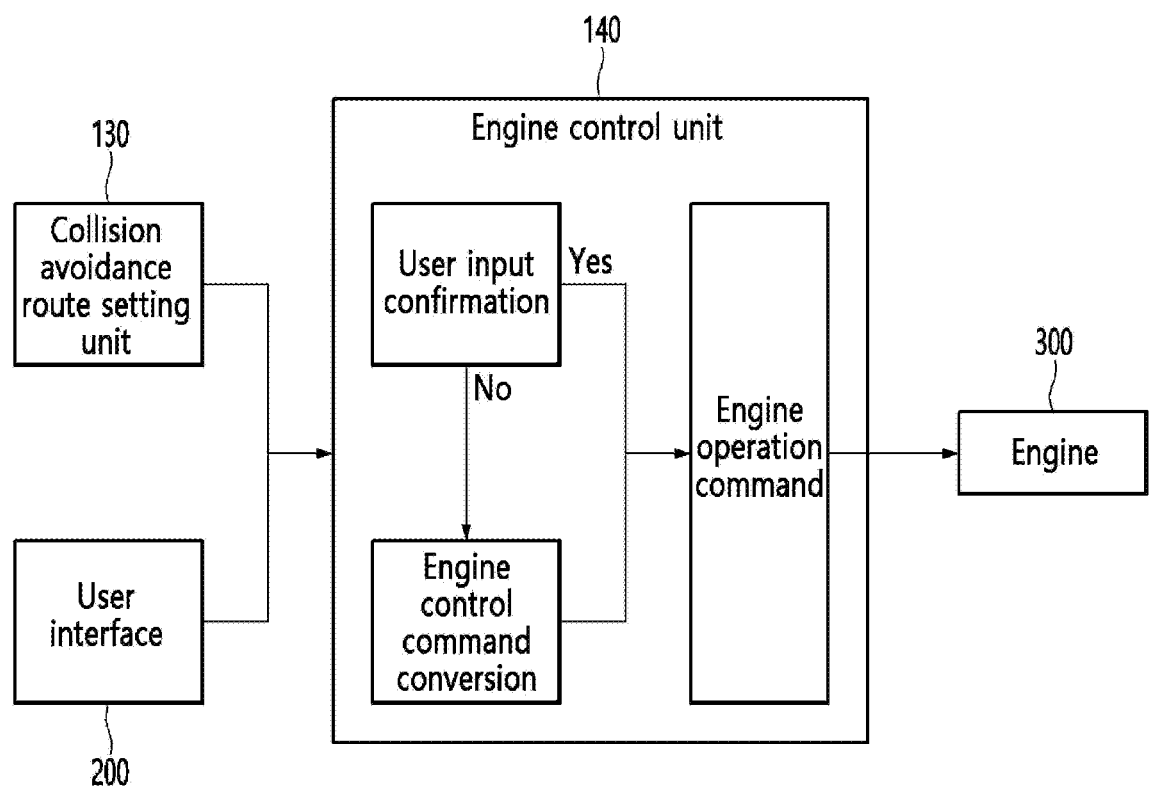
FIG. 15 is a diagram for describing an example of an operation of an engine control unit, according to an embodiment of the present disclosure.

For example, in order to register available sensor types in advance, the user may input installed sensors through a separate user interface 200 (see FIG. 15).

Alternatively, as another embodiment, the sensor fusion unit 120 may broadcast a message to the sensor unit 110, receive responses to the message from a plurality of sensors installed in the sensor unit 110, and register available sensors according to the received responses.

Even though not described herein, any other method of determining available sensor types may be applied.

Thus, the sensor fusion unit 120 may identify in advance the types of available sensors including the camera 111 and the GPS 115, and obtain sensing information from the identified available sensors.

The sensor fusion unit 120 according to an embodiment of the present disclosure may integrate sensing information obtained from the available sensors, by using a deep learning-based learning module or a probabilistic inference method.

One piece of sensing information may be obtained for one object by applying probabilistic inference based on a plurality of pieces of sensor data obtained from the available sensors. The plurality of sensors may detect objects in their respective manners, and sensing information may be integrated by probabilistically inferring whether the detected objects are different objects or the same object.

In addition, among the available sensors, a sensor configured to perform image-based object detection by using an image may track an object through a deep learning-based object tracking algorithm on an image obtained from the sensor.

In detail, the sensor fusion unit 120 may determine the position of the host ship from the GPS 115, and obtain information about an object ahead of the host ship, from an image captured by the camera 111.

In addition, when the available sensor is the AIS 116, information about an object having the corresponding equipment within a set distance from the position of the host ship may be obtained from the AIS 116. The AIS 116 is a sensor capable of determining the positions and movements of ships, light buoys, and the like, which are equipped with the corresponding equipment, and information about an moving object equipped with the AIS 116 may be obtained by using the AIS 116.

When the available sensor is the RADAR 112, information about stationary objects and moving objects around the host ship may be obtained from the RADAR 112.

When the available sensor is the ENC 113, information about an sea area near the host ship may be obtained from the ENC 113 to obtain a group of travelable route candidates. For example, the ENC 113 includes information about a coastline, a contour line, a water depth, a navigational sign such as a lighthouse or a light buoy, and the like, and information about stationary objects including marine areas as well as land areas may be obtained by using the ENC 113.

When the available sensor is the LiDAR 114, object information based on point cloud data may be obtained from the LiDAR 114.

When the available sensor is the sonar 117, information about an undersea terrain or an underwater obstacle may be obtained from the sonar 117.

If the available sensors are the IMU and the host ship DB, at least one of the motion state, maneuverability, and initial route setting information of the host ship may be obtained from the IMU and the host ship DB. The motion state of the host ship may be obtained from the IMU and the initial route setting information may be obtained from the host ship DB, or the motion state of the host ship may be obtained from the IMU and the maneuverability may be obtained from the host ship DB, to predict a future driving state according to the current driving state.

In other words, sensing may be performed according to the type of sensor depending on the available sensor, and an object may be selected and tracked by comparing obtained pieces of sensing information.

For example, when the RADAR 112 and the AIS 116 detect objects within a preset range, it may be determined that one object is detected by the RADAR 112 and the AIS 116, and thus, sensor data may be integrated.

In addition, when the RADAR 112 detects an obstacle on land, the object corresponds to data irrelevant to driving of the host ship, and thus, object information detected by the RADAR 112 integrating sensor data from the ENC 113 may be deleted.

Alternatively, when the sonar 117 detects an underwater obstacle by obtaining undersea terrain or underwater obstacle information, information about above-water obstacles detected by other sensors may be integrated, and information about obstacles that impede driving on the water or in the water may be provided at once.

Alternatively, the LiDAR 114 detects an object that is irrelevant to the driving of the host ship, information about the detected object may be deleted. Through the above-described processes, pieces of sensing information may be compared with each other to reduce sensing errors and select information about driving-related obstacles.

The sensor fusion unit 120 may perform probabilistic inference on sensing information based on the accuracy of a sensor according to an input type of sensor, such that accurate sensing information may be output even when a different type of sensor is input. By expressing an uncertainty as a numerical certainty by inferring whether an object exists by using a plurality of sensors performing sensing in different manners rather than using a single sensor, the presence or absence of an object or the type of the object that is highly likely to be real comprehensively considering each sensor data of the sensor unit 110 may be output.

Hereinafter, an example of a fusion sensor unit will be described with reference to FIG. 14.

Figure 14:
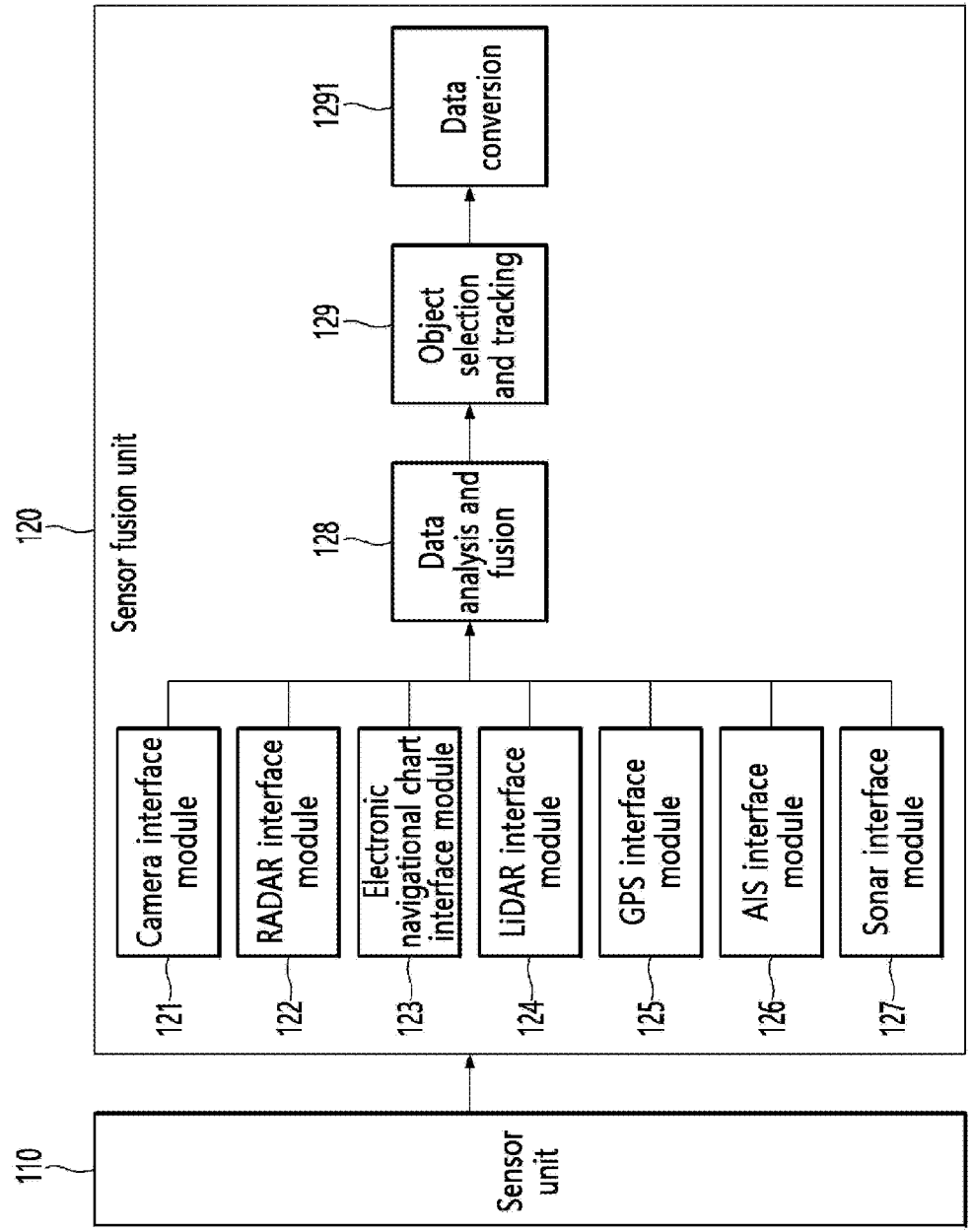
FIG. 14 is a diagram for describing an example of a fusion sensor unit according to an embodiment of the present disclosure.

FIG. 14 is a diagram for describing an example of a fusion sensor unit according to an embodiment of the present disclosure.

Referring to FIG. 14, the sensor fusion unit 120 may obtain sensing information by converting sensor data obtained from each sensor of the sensor unit 110 into data of the same format through respective interface modules 121, 122, 123, 124, 125, 126, and 127, and performing data analysis and fusion (128) to organize duplicate sensor data.

From the sensing information obtained through the data analysis and fusion (128), an object that may serve as an obstacle may be selected and tracked (129). Rather than simply issuing a warning about an object detected by the sensor unit 110 of the ship or tracking only an object selected by the user, an object may be selected by analyzing and fusing sensor data of the sensor unit 110, and then, the selected object may be continuously tracked.

For example, when the object is a ship that is a moving object, the velocity and movement direction of the ship, a point that overlaps the movement route of the host ship, and the like may be tracked. By estimating a motion state according to the movement of the other ship, it is possible to track the other ship based on environmental information such as a current wind direction or a tidal current.

Data conversion may be performed by matching resulting data of object selection and tracking with the collision avoidance route setting unit 130 or the display unit 150 (1291).

The respective sensor interface modules 121, 122, 123, 124, 125, 126, and 127, the data analysis and fusion (128), the object selection and tracking (129), and the data conversion (1291) are logical divisions of functions of the sensor fusion unit 120, and may be integrated and implemented in one computing device, or may be implemented in separate units according to each logical function.

The collision avoidance route setting unit 130 according to an embodiment of the present disclosure may determine an avoidance route candidate according to the presence or absence and type of an object determined by the sensor fusion unit 120, determine an avoidance route considering the maneuverability of the host ship, and generate an engine control command according to the determined avoidance route.

Hereinafter, an example of an engine control unit will be described with reference to FIG. 15.

FIG. 15 is a diagram for describing an example of an operation of an engine control unit, according to an embodiment of the present disclosure.

Referring to FIG. 15, the collision avoidance route setting unit 130 may generate an engine control command according to a determined avoidance route. As illustrated in FIG. 15, the engine control unit 140 configured to receive an engine control command from the collision avoidance route setting unit 130 may convert an engine control command of the collision avoidance route setting unit 130 according to an engine state of the host ship.

When the collision avoidance route setting unit 130 determines an avoidance route, an engine 300 of the host ship may be controlled through the engine control unit 140 according to a driving direction and velocity to travel through the avoidance route.

In other words, when the collision avoidance route setting unit 130 determines the avoidance route, the engine 300 needs to be controlled to follow the avoidance route, and the engine control unit 140 may deliver a control command for controlling the engine 300.

In addition, the engine control unit 140 may receive an engine control command through the collision avoidance route setting unit 130, or may directly receive a user input through the user interface 200.

The user interface 200 may include a control device configured to control the engine, such as a joystick, a steering wheel, or a throttle, and may also include the display unit 150 described above.

When the user interface 200 is the display unit 150, an avoidance route may be displayed through the user interface 200 and simultaneously an engine control command may be input through the user interface 200.

When the engine control unit 140 simultaneously receives a user input from the user interface 200 and an engine control command from the collision avoidance route setting unit 130, the engine control unit 140 may control the engine by giving the user input a higher priority than the control command from the collision avoidance route setting unit 130.

As illustrated in FIG. 15, when there is a user input confirmed ('Yes' in FIG. 15), the engine 300 may be controlled by generating an engine operation command according to the user input. Alternatively, when there is no user input ('No' in FIG. 15), the engine control command from the collision avoidance route setting unit 130 is converted to generate an engine operation command, and the engine 300 may be controlled. That is, when the user makes a decision different from that of the collision avoidance route setting unit 130 through the display unit 150 on which sensing information from the sensor fusion unit 120 is displayed, the user's selection is given priority and the user is allowed to access the engine.

Here, the display unit 150 according to an embodiment of the present disclosure may output data received from the collision avoidance route setting unit 130 and the sensor fusion unit 120, as an augmented reality image.

For example, a detected object may be output in augmented reality based on a sensor fusion result and an image captured by the camera 111, through a separate device for outputting an augmented reality image. As another example, data received from the collision avoidance route setting unit 130 and the sensor fusion unit 120 may be displayed on a multi-function display (MFD) device mounted on an existing ship.

In addition, when the user does not want to follow the avoidance route determined by the collision avoidance route setting unit 130 and presented on the display unit 150, the host ship may be controlled through manual manipulation by receiving a user input through the user interface 200 (see FIG. 15).

Hereinafter, an example of a computing device according to an embodiment of the present disclosure will be described with reference to FIG. 16.

Figure 16:
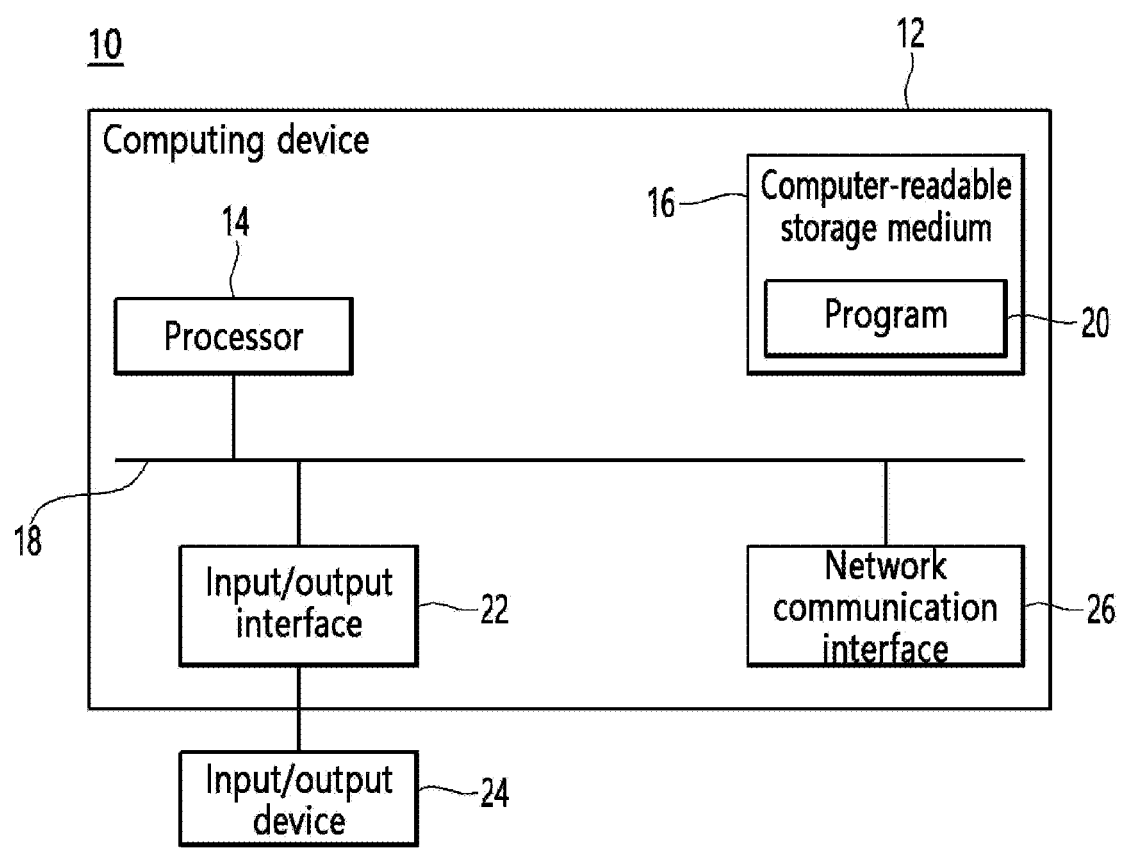
FIG. 16 is a diagram for describing an example of a computing device on which a method according to an embodiment of the present disclosure is performed.

FIG. 16 is a block diagram for describing an example of a computing environment including a computing device, according to an embodiment of the present disclosure. In the illustrated embodiment, respective components may have different functions and capabilities in addition to those described below, and additional components other than those described below may be included. The calculation of the available velocity area, the calculation of the velocity obstacle area, the calculation of the collision risk, determination of an avoidance route, selecting of a control strategy, delivering of control signal to engine, and various functions and operations described in this description may be performed by the computing device of FIG. 16.

A computing environment 10 illustrated in FIG. 16 includes a computing device 12, and the computing device 12 may include a computer-readable storage medium having recorded thereon a computer program to be executed to implement the above-described method on a computer.

The computing device 12 includes at least one processor 14, a computer-readable storage medium 16, and a communication bus 18. The processor 14 may cause the computing device 12 to operate according to the example embodiments described above. For example, the processor 14 may execute one or more programs stored in the computer-readable storage medium 16. The one or more programs may include one or more computer-executable instructions, which, when executed by the processor 14, cause the computing device 12 to perform operations according to the example embodiments.

The computer-readable storage medium 16 is configured to store computer-executable instructions or program code, program data, and/or other suitable form of information. A program 20 stored in the computer-readable storage medium 16 includes a set of instructions executable by the processor 14. In an embodiment, the computer-readable storage medium 16 may be a memory (a volatile memory such as random-access memory, a non-volatile memory, or an appropriate combination thereof), one or more magnetic disk storage devices, optical disk storage devices, flash memory devices, other storage media that are accessible by the computing device 12 and capable of storing desired information, or a suitable combination thereof.

The communication bus 18 connects various other components of the computing device 12, including the processor 14 and the computer-readable storage medium 16, to each other.

The computing device 12 may also include one or more input/output interfaces 22 configured to provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22.

The exemplary input/output device 24 may include, but is not limited to, input devices such as a pointing device (e.g., a mouse or a trackpad), a keyboard, a touch input device (e.g., a touchpad or a touch screen), a voice or sound input device, various types of sensor devices and/or photographing devices, and/or output devices such as a display device, a printer, a speaker, and/or a network card. The exemplary input/output device 24 may be included in the computing device 12 as a component constituting the computing device 12, or may be connected to the computing device 12 as a separate device from the computing device 12. The network communication interface 26 includes Ethernet communication, controller area network (CAN) communication, serial communication, and the like.

Meanwhile, the above-described method may be written as a computer-executable program, and may be implemented in a general-purpose digital computer that executes the program by using a computer-readable recording medium. In addition, the structure of the data used in the above-described method may be recorded in a computer-readable recording medium through various units. The computer-readable recording medium includes a storage medium, such as a magnetic storage medium (e.g., read-only memory (ROM), random-access memory (RAM), a universal serial bus (USB) drive, a floppy disk, a hard disk, etc.) and an optically readable medium (e.g., a compact disc ROM (CD-ROM), a digital video disc (DVD), etc.).

The above-described method may be provided in a computer program product. The computer program product may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

It will be understood by those of skill in the art that the present disclosure may be implemented in a modified form without departing from the intrinsic characteristics of the descriptions provided above. Therefore, the disclosed methods should be considered in an illustrative rather than a restrictive sense, and the scope of the present disclosure should be defined by claims rather than the foregoing description, and should be construed to include all differences within the scope equivalent thereto.

EXPLANATION OF REFERENCE NUMERALS DESIGNATING THE MAJOR ELEMENTS OF THE DRAWINGS

110: Sensor unit
111: Camera
112: RADAR
113: Electronic navigational chart
114: LiDAR
115: GPS
116: AIS
117: Sonar
120: Sensor fusion unit
130: Collision avoidance route setting unit
140: Engine control unit
150: Display unit
121, 122, 123, 124, 125, 126, 127: Sensor interface modules
200: User interface
300: Engine

The invention claimed is:

1. A method performed by a device, comprising a memory and a processor, for calculating a collision risk of a ship, the method comprising:
calculating a plurality of available velocity areas based on maneuvering performance of a host ship, wherein the plurality of available velocity areas includes a first available and a second available velocity area, first available velocity area the second available velocity area being defined based on a degree of changes of a velocity and a movement direction of the host ship, the first available velocity area and the second available velocity area being assigned with a first weight value and a second weight value, respectively, the second weight value being different from the first weight value;
calculating a velocity obstacle area where there is a possibility of collision between an object and the host ship;
calculating an overlapping area where the plurality of available velocity areas and the velocity obstacle area overlap each other; and
calculating a collision risk by applying the first weight value and the second weight value to the overlapping area.

2. The method of claim 1, wherein the calculating of the plurality of available velocity areas comprises calculating the plurality of available velocity areas of the host ship based on at least one of a velocity vector with respect to the movement direction of the host ship, a velocity vector with respect to a direction perpendicular to the movement direction of the host ship, and an angular velocity vector of the host ship.

3. A no transitory computer-readable recording medium having recorded thereon a program for causing a computer to execute the method of claim 1.

4. The method of claim 1, further comprising displaying, to a user, the plurality of available velocity area, the velocity obstacle area, or the collision risk, any combination thereof.

5. The method of claim 1, further comprising generating an avoidance route for the object based on the collision risk.

6. The method of claim 1, further comprising:
obtaining sensing information of the object by using a plurality of sensors; and
integrating the sensing information obtained from the plurality of sensors,
wherein the calculating of the velocity obstacle area comprises calculating the velocity obstacle area based on the integrated sensing information and information about a velocity and a direction of the host ship.

7. A device for calculating a collision risk of a ship, the device comprising:
at least one memory; and
at least one processor,
wherein the at least one processor is configured to
calculate a plurality of available velocity areas based on maneuvering performance of a host ship, wherein the plurality of available velocity areas includes a first available velocity area and a second available velocity area, the first available velocity area and the second available velocity area being defined based on a degree of changes of a velocity and a movement direction of the host ship, the first available velocity area and the second available velocity area being assigned with a first weight value and a second weight value respectively the second weight value being different from the first weight value, calculate a possible collision area of an object and the host ship, calculate an overlapping area where the plurality of available velocity areas and the velocity obstacle area overlap each other; and calculate a collision risk by applying the first weight value and the second weight value to the overlapping area.

8. The method of claim 5, further comprising:

generate an engine control command of the host ship based on the generated avoidance route.

9. The device of claim 7, further comprising a display unit configured to display, to a user, the plurality of available velocity areas, the possible collision area, or the collision risk, or any combination thereof.

10. The device of claim 7, wherein the at least one processor is further configured to generate an avoidance route for the object based on the collision risk.

11. The device of claim 10, wherein the at least one processor is further configured to generate an engine control command for the host ship based on the generated avoidance route.

12. The device of claim 7, wherein the at least one processor is further configured to obtain sensing information of the object by using a plurality of sensors, integrate the sensing information obtained from the plurality of sensors, and calculate the possible collision area based on the integrated sensing information and information about a velocity and a direction of the host ship.

13. The device of claim 7, wherein the at least one processor is further configured to generate warning information about a collision between the at least-one-object and the host ship, based on a comparison of the collision risk with a preset value.

* * * * *